United States Patent
Stadelmeier et al.

(10) Patent No.: US 10,951,370 B2
(45) Date of Patent: *Mar. 16, 2021

(54) DEMAPPING APPARATUS AND METHOD FOR RECEPTION OF DATA IN A MULTI-CARRIER BROADCAST SYSTEM

(71) Applicant: SATURN LICENSING LLC, New York, NY (US)

(72) Inventors: Lothar Stadelmeier, Stuttgart (DE); Joerg Robert, Vreden (DE); Samuel Asangbeng Atungsiri, Hampshire (GB); Nabil Loghin, Stuttgart (DE)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,549

(22) Filed: Dec. 21, 2018

(65) Prior Publication Data

US 2019/0253212 A1 Aug. 15, 2019

Related U.S. Application Data

(63) Continuation of application No. 15/068,240, filed on Mar. 11, 2016, now abandoned, which is a
(Continued)

(30) Foreign Application Priority Data

Feb. 11, 2010 (EP) ..................................... 10153378
Oct. 15, 2010 (EP) ..................................... 10187777

(51) Int. Cl.
*H04L 5/00* (2006.01)
*H04H 60/07* (2008.01)
(Continued)

(52) U.S. Cl.
CPC ........... *H04L 5/0044* (2013.01); *H04H 60/07* (2013.01); *H04L 5/0096* (2013.01);
(Continued)

(58) Field of Classification Search
CPC ...... H04L 5/0044; H04L 45/24; H04L 5/0096
See application file for complete search history.

(56) References Cited

U.S. PATENT DOCUMENTS

| 5,671,227 A | 9/1997 | Keller et al. |
| 6,574,279 B1 | 6/2003 | Vetro et al. |

(Continued)

FOREIGN PATENT DOCUMENTS

| EP | 2 134 044 A1 | 12/2009 |
| EP | 2 175 600 | 4/2010 |

OTHER PUBLICATIONS

DVB Organisation: "Digital Video Broadcasting (DVB); Frame structure channel coding and modulation for a second generation digital terrestrial television broadcasting system (DVB-T2)", Sep. 1, 2009 (Sep. 1, 2009) (Year: 2009).*

(Continued)

*Primary Examiner* — Parth Patel
(74) *Attorney, Agent, or Firm* — Oblon, McClelland, Maier & Neustadt, L.L.P.

(57) ABSTRACT

An apparatus and a corresponding method for mapping payload data of mapping input data streams onto a mapping output data stream having a channel bandwidth for transmission in a multi-carrier broadcast system includes first and second frame forming mechanisms. The first frame forming mechanism is adapted to form first frames having a first frame structure and the second frame forming mechanism is adapted to form second frames having a second frame structure. Preferably, in a second frame structure the data blocks of a particular mapping input data stream are spread
(Continued)

in time and frequency over various data symbols and various data segments of the second frames to provide high robustness against disturbances. The payload portion of the second frame is preferably segmented into various data segments enabling use of a narrow-band receiver, even if both the first and second frames cover the same total channel bandwidth.

20 Claims, 20 Drawing Sheets

Related U.S. Application Data continuation of application No. 13/578,446, filed as application No. PCT/EP2011/051756 on Feb. 7, 2011, now abandoned.

(51) Int. Cl.

| | | |
|---|---|---|
| *H04L 27/26* | (2006.01) | |
| *H04N 21/2389* | (2011.01) | |
| *H04N 21/643* | (2011.01) | |
| *H04N 19/30* | (2014.01) | |
| *H04L 12/707* | (2013.01) | |
| *H04H 20/33* | (2008.01) | |

(52) U.S. Cl.
CPC .......... *H04L 27/2602* (2013.01); *H04L 45/24* (2013.01); *H04N 19/30* (2014.11); *H04N 21/2389* (2013.01); *H04N 21/64315* (2013.01); *H04H 20/33* (2013.01); *H04L 5/0023* (2013.01); *H04L 5/0048* (2013.01); *H04L 5/0053* (2013.01); *H04L 5/0064* (2013.01); *H04L 27/262* (2013.01)

(56) References Cited

U.S. PATENT DOCUMENTS

| | | |
|---|---|---|
| 6,628,651 B1 | 9/2003 | Ryan et al. |
| 7,394,876 B2 | 7/2008 | Sestok, IV |
| 7,653,924 B1 | 1/2010 | Deng |
| 8,261,308 B2 | 9/2012 | Vare |
| 8,363,740 B2 | 1/2013 | Stadelmeier |
| 8,520,754 B2 | 8/2013 | Yokokawa |
| 8,553,809 B2 | 10/2013 | Shinya |
| 8,750,398 B2 | 6/2014 | Ko |
| 8,774,286 B2 | 7/2014 | Yokokawa |
| 8,792,322 B2 | 7/2014 | Stadelmeier |
| 8,995,533 B2 | 3/2015 | Chen |
| 2002/0026501 A1 | 2/2002 | Hoang |
| 2002/0064173 A1 | 5/2002 | Watanabe |
| 2002/0193146 A1 | 12/2002 | Wallace et al. |
| 2003/0016648 A1 | 1/2003 | Lindsay et al. |
| 2004/0240376 A1 | 12/2004 | Wang |
| 2005/0036481 A1 | 2/2005 | Chayat |
| 2005/0068386 A1 | 3/2005 | Wang |
| 2005/0089108 A1 | 4/2005 | Okada |
| 2005/0099975 A1 | 5/2005 | Catreux |
| 2005/0213679 A1 | 9/2005 | Yamagata |
| 2005/0213680 A1 | 9/2005 | Atungsiri |
| 2006/0023750 A1 | 2/2006 | Kim |
| 2006/0104376 A1 | 5/2006 | Abe |
| 2007/0030798 A1 | 2/2007 | Okada |
| 2007/0065078 A1* | 3/2007 | Jiang ................ H04L 12/2861 385/76 |
| 2007/0070179 A1* | 3/2007 | van Rooyen .... H04N 21/41407 348/14.02 |
| 2007/0670179 | 3/2007 | van Rooyen |
| 2007/0165729 A1* | 7/2007 | Ha ........................ H04L 1/0065 375/260 |
| 2007/0183518 A1* | 8/2007 | Ma ........................ H04L 5/0026 375/260 |
| 2007/0189393 A1* | 8/2007 | Lee ......................... H04H 40/09 375/240.25 |
| 2007/0195632 A1 | 8/2007 | Liu |
| 2007/0195832 A1* | 8/2007 | Liu ........................ H04J 3/1617 370/539 |
| 2008/0037656 A1* | 2/2008 | Hannuksela ..... H04N 21/23614 375/240.26 |
| 2008/0039107 A1* | 2/2008 | Ma ............................ H04B 7/02 455/450 |
| 2008/0098439 A1* | 4/2008 | Taura .................... H04B 7/0874 725/75 |
| 2008/0101482 A1* | 5/2008 | Labbe ................ H04L 25/0212 375/260 |
| 2008/0170490 A1* | 7/2008 | Connors ............. H04L 27/2647 370/203 |
| 2008/0170529 A1* | 7/2008 | Connors ................ H04H 20/30 370/312 |
| 2008/0170530 A1* | 7/2008 | Connors ................ H04H 20/67 370/312 |
| 2008/0170531 A1* | 7/2008 | Petry .................... H04L 65/601 370/312 |
| 2008/0232490 A1* | 9/2008 | Gross .................. H04L 5/0037 375/260 |
| 2009/0034668 A1* | 2/2009 | Ashikhmin ......... H04L 27/2662 375/354 |
| 2009/0097447 A1* | 4/2009 | Han ...................... H04L 5/0007 370/330 |
| 2009/0180561 A1* | 7/2009 | Kim ..................... H04B 7/0413 375/260 |
| 2009/0190677 A1* | 7/2009 | Jokela ................... H04L 1/0071 375/260 |
| 2009/0196217 A1* | 8/2009 | Himmanen ............. H04L 12/56 370/328 |
| 2009/0207771 A1* | 8/2009 | Lindskog ........... H04L 12/1868 370/312 |
| 2009/0219932 A1* | 9/2009 | Kobayashi ............ H04L 65/605 370/389 |
| 2009/0225822 A1* | 9/2009 | Tupala ................ H04L 27/2659 375/226 |
| 2010/0034219 A1* | 2/2010 | Stadelmeier ........ H04L 27/2613 370/478 |
| 2010/0046652 A1* | 2/2010 | Kawauchi ........... H04L 25/0216 375/260 |
| 2010/0135422 A1* | 6/2010 | Lee ........................ H04L 1/0072 375/260 |
| 2010/0158046 A1* | 6/2010 | Pu ....................... H04L 27/2626 370/474 |
| 2010/0158047 A1* | 6/2010 | Lee ....................... H04H 20/103 370/474 |
| 2010/0195668 A1* | 8/2010 | Robert .................. H04L 5/0007 370/475 |
| 2010/0226366 A1* | 9/2010 | Lee ....................... H04L 65/607 370/389 |
| 2010/0290561 A1* | 11/2010 | Ko ......................... H04L 1/0071 375/298 |
| 2010/0329673 A1* | 12/2010 | Duan ....................... H04J 3/04 398/45 |
| 2011/0019101 A1* | 1/2011 | Goto .................... H04L 27/2659 348/725 |
| 2011/0103300 A1* | 5/2011 | Vare ..................... H04N 21/6112 370/328 |
| 2011/0158334 A1* | 6/2011 | Arambepola ....... H04L 25/0204 375/260 |
| 2011/0205983 A1* | 8/2011 | Bharadwaj ............ H04L 1/0025 370/329 |
| 2011/0274204 A1* | 11/2011 | Ko ......................... H04B 7/022 375/295 |
| 2011/0274211 A1* | 11/2011 | Ko ..................... H03M 13/2906 375/300 |
| 2011/0292903 A1* | 12/2011 | Jongren ................ H04L 5/0032 370/329 |
| 2012/0243561 A1* | 9/2012 | Loghin ................. H04L 1/0006 370/537 |
| 2012/0300690 A1 | 11/2012 | Vare |

(56) References Cited

U.S. PATENT DOCUMENTS

| | | | | |
|---|---|---|---|---|
| 2012/0324523 | A1* | 12/2012 | Stadelmeier | H04L 27/2602 725/118 |
| 2012/0327879 | A1* | 12/2012 | Stadelmeier | H04B 7/0689 370/329 |
| 2013/0039303 | A1* | 2/2013 | Stadelmeier | H04H 60/07 370/329 |

OTHER PUBLICATIONS

Draft ETSI TR 102 8xx V<0.0.0>, Digital Video Broadcasting (DVB); Implementation Guidelines for a second generation digital cable transmissions ystem (DVB-C2), ETSI, pp. 1 to 146, (Jan. 2010) (Year: 2010).*

Combined Office Action and Search Report dated Jul. 20, 2015, in Taiwanese Patent Application No. 100104112.

"Digital Video Broadcasting (DVB); Fram structure channel coding and modulation for a second generation digital transmission system for cable sstems (DVB-C2)," DVB Bluebook A138, pp. 1 to 109, (Apr. 2009).

ETSI EN 302 755 V1.11, "Digital Video Braodcasting (DVB); Frame structure channel coding and modulation for a second generation digital terrestrial television broadcasting system (DVB-T2)," ETSI; pp. 1 to 167, (Sep. 2009).

Draft ETSI TR 102 8xx V<0.0.0>, Digital Video Broadcasting (DVB); Implementation Guidelines for a second generation digital cable transmissions ystem (DVB-C2), ETSI, pp. 1 to 146, (Jan. 2010).

International Search Report dated May 30, 2011 in Related Application PCT/EP11/51754 Filed Feb. 7, 2011.

International Search Report dated Aug. 21, 2012 in PCT/EP11/51756 Filed Feb. 7, 2011.

AX Draft ETSI TR 102 8xx V<0.0.0>, Digital Video Broadcasting (DVB); Implementation Guidelines for a second generation digital cable transmission system (DVB-02), ETSI, pp. 1 to 146, (Jan. 2010).

* cited by examiner

DEMAPPING APPARATUS AND METHOD FOR RECEPTION OF DATA IN A MULTI-CARRIER BROADCAST SYSTEM

CROSS-REFERENCE TO RELATED APPLICATIONS

This application is a continuation of and claims the benefit of priority under 35 U.S.C. § 120 to U.S. application Ser. No. 15/068,240, filed Mar. 11, 2016, which is a continuation of U.S. application Ser. No. 13/578,446, filed Sep. 17, 2012, the entire contents of both of which are incorporated herein by reference. U.S. application Ser. No. 13/578,446 is a U.S. national stage application under 35 U.S.C. § 371 of International Application No. PCT/EP11/051756 filed Feb. 7, 2011, which claims priority to European Application No. 10 153 378.4 filed Feb. 11, 2010, and European Application No. 10 187 777.7 filed Oct. 15, 2010.

FIELD OF INVENTION

The present invention relates to an apparatus for mapping payload data of mapping input data streams onto a mapping output data stream having a channel bandwidth for transmission in a multi-carrier broadcast system. Further, the present invention relates to a transmission apparatus for transmitting data within a multi-carrier broadcast system. Still further, the present invention relates to corresponding methods, and a computer readable nontransitory medium.

The present invention relates, for instance, to the field of Digital Video Broadcasting (DVB) utilizing Orthogonal Frequency Division Multiplexing (OFDM). Further, the present invention can generally be applied in other broadcast systems, such as DAB (Digital Audio Broadcasting), DRM, MediaFlo, or ISDB systems.

BACKGROUND OF THE INVENTION

The transmission parameters of known broadcast systems, such as the broadcast systems in accordance with the DVB-T2 standard (second generation digital terrestrial television broadcast systems standard as defined in ETSI EN 302 755 V1.1.1 (2009-09) "Digital Video Broadcasting (DVB); Framing structure Channel Coding and Modulation for a Second Generation Digital Terrestrial Television Broadcast system (DVB-T2)"), are a Second Generation Digital Terrestrial Television Broadcast system (DVB-T2)≤), are generally optimized for fixed reception with stationary receivers, e.g. with roof-top antennas, for which low power consumption is not a main issue. Further, according to this standard a fixed channel bandwidth is generally used. In future broadcast systems, such as the upcoming DVB-NGH (DVB Next Generation Handheld; in the following also referred to as NCH) standard, a mobile receiver (which is the main focus of this upcoming standard) shall support a variety of different channel bandwidths, e.g. ranging from 1.7 MHz to 20 MHz wide channels. However, it is difficult for a mobile receiver to receive larger bandwidths up to 20 MHz due to its limited processing power. Furthermore, it has to account for specific needs of mobile and handheld reception, i.e. low power consumption and high robustness.

SUMMARY OF INVENTION

It is an object of the present invention to provide an apparatus and a corresponding method for mapping payload data of mapping input data streams onto a mapping output data stream having a channel bandwidth for transmission in a multi-carrier broadcast system, which enable the use of narrow-band receivers having a low power consumption. It is a further object of the present invention to provide a corresponding transmission apparatus and method, a computer program for implementing the 'napping method on a computer, a computer readable non-transitory medium, as well as an appropriate frame structure.

According to an aspect of the present invention there is provided an apparatus for mapping payload data of mapping input data streams onto a mapping output data stream having a channel bandwidth for transmission in a multi-carrier broadcast system, said apparatus comprising
  a data input for receiving said mapping input data streams each being subdivided into data blocks carrying payload data and for receiving signalling data,
  a first frame forming means for mapping the data blocks of a first group of received mapping input data streams onto first frames having a first frame structure covering said channel bandwidth for use by receivers of a first type,
  a second frame forming means for mapping the data blocks of a second group of received mapping input data streams onto second frames having a second frame structure covering said channel bandwidth for use by receivers of a second type, which second frame structure is different from the first frame structure, each of said second frames comprising a preamble portion and a payload portion, wherein the second frame forming means is adapted for mapping the signalling data onto the preamble portion, which comprises at least one preamble symbol carrying at least one preamble signalling block including signalling data, and for mapping the payload data onto the payload portion comprising a plurality of data symbols carrying payload data of at least two mapping input data streams, said payload portion being segmented into data segments each covering a bandwidth portion of said channel bandwidth,
  a stream forming means for forming said mapping output data stream by alternately arranging one or more first and one or more second frames, and
  a data output for outputting said mapping output data stream.

According to a further aspect of the present invention there is provided a transmission apparatus for transmitting data within a multi-carrier broadcast system comprising an apparatus for mapping as defined above and a transmitter unit for transmitting the mapping output data stream.

According to further aspects of the present invention there is provided a method for mapping payload data of mapping input data streams onto a mapping output data stream and a computer readable non-transitory medium having instructions stored thereon which, when carried out on a computer, cause the computer to perform the steps of the method according to the present invention is provided.

Preferred embodiments of the invention are defined in the dependent claims. It shall be understood that the claimed mapping method and the claimed computer readable non-transitory medium have similar and/or identical preferred embodiments as the claimed mapping apparatus and as defined in the dependent claims.

The present invention is based on the idea to construct the mapping output data stream such that it comprises two different types of frames, each having its own frame structure. These two types of frames are alternately arranged in the mapping output data stream such that alternately one or more second frames follow one or more first frames and so on as, for instance, defined in the superframe structure according to the DVB-T2 standard, according to which T2-frames and FEF frames (Future Extension Frames) are alternately arranged.

The first frames are designed for reception by a first type of receiver, e.g. a stationary receiver such as a DVB-T2 receiver, while the second frames are designed for reception by a second type of receiver, e.g. a mobile receiver such as a DVB-NGH receiver. To enable, however, the use of narrow-band receivers for receiving and processing the second frames despite both the first and second frames use the same (fixed) channel bandwidth, it is further proposed according to the present invention to apply the concept of band segmentation in the second frame structure. Such a segmentation of the payload portion (which carries the actual payload data) of the second frames, according to which the payload portion is segmented into (two or more) data segments each covering a bandwidth portion of the total channel bandwidth, the power consumption of the used narrow-band receiver can be kept low. Additionally, one fixed receiver tuner bandwidth is sufficient for the reception of all available transmission bandwidths.

The frame structure applied for the second frames thus uses the band segmentation concept as, for instance, described in the DVB-C2 standard (DVB BlueBook A138 "Digital Video Broadcasting (DVB); frame structure channel coding and modulation for a second generation digital transmission system for cable systems (DVB-C2)") according to which the total channel bandwidth is divided into data slices (generally referred to herein as "data segments"). Quite similar as described in the DVB-C2 standard, the second frames comprise a preamble portion and a payload portion, wherein the preamble portion comprises at least one preamble symbol carrying at least one preamble signalling block including signalling data. The data segments of the payload portion may have flexible bandwidths and are generally not aligned to a frequency raster. All data of a mapping input data stream may be transmitted within one data segment, but this is not an essential requirement as will be explained below. Further, the preamble signalling blocks may not be aligned to the frequency raster of the data segments. Data segments may also be combined in frequency direction to an overall broader data pipe having a broader bandwidth, and may also contain data of more than one mapping input data stream.

Further, the concept of absolute OFDM may be applied for the frame structure of the second frames, according to which all OFDM subcarriers are seen relative to the absolute frequency 0 MHz instead of a signal center frequency. Reason for the application of absolute OFDM and unique pilot pattern across the medium spectrum, as applied in DVB-C2, is to avoid in the preamble symbols repeating OFDM subcarrier allocations in the frequency domain that result in an increased PAPR (Peak to Average Power Ratio). Furthermore, the recognition of signals provided for particular receivers (e.g. mobile receivers, for instance according to the upcoming DVB-NGH standard) during initial acquisition gets faster and more reliable with the help of the frequency specific pilot patterns.

The frame structure applied for the first frames may, as proposed according to a preferred embodiment, be the frame structure as described in the DVB-T2 standard for the T2-frames, and the second frames may be the FEF frames as described in the DVB-T2 standard. Both frames may thus be arranged alternately to obtain a superframe structure as generally described in the DVB-T2 standard. Further, both frames may carry data from the same mapping input data streams but with a different robustness level and different data throughput (i.e. different data density) if designed for reception by different kinds of receivers. For instance, the first frames may carry the data with a high density for reception by stationary receivers, while the second frames may carry the same data with low density for reception by mobile receivers. In other embodiments, however, the two different types of frames may carry data from different (or only partly the same) mapping input data streams, for instance if different services or data shall be provided to the different kinds of receivers.

According to a preferred embodiment the second frame forming means is adapted for mapping the data blocks (also referred to as "bursts" or "data patterns") of a mapping input data stream onto a second frame such that they are mapped onto a single data segment or onto two or more, in particular neighbouring, data segments of said second frame. In particular, the data blocks are mapped onto data symbols of a single or of two or more (bundled) data segments. A "data symbol" thus has to be understood as a portion (in time direction) of a data segment, onto which a data block can be mapped.

Hence, as mentioned above, data segments can be combined to obtain a broader "data segment", which is also referred to as a "data pipe". The same concept of a segmented payload portion of the second frames can be used, even if mapping input data streams having a higher data density shall be mapped onto a second frame. According to a more general scenario the data blocks of a particular mapping input data stream are mapped onto two or more data segments, which are not neighbouring in frequency direction. In all these embodiments the receiver needs to have a broader bandwidth.

Preferably, the second frame forming means is adapted for selecting the number of, in particular neighbouring, data symbols per second frame onto which the data blocks of a mapping input data stream are mapped. Hence, according to this embodiment the number of data symbols onto which the data blocks of a mapping input data stream are mapped is not fixed, but is variable, in particular according to the needs of the respective mapping input data stream.

In an embodiment, the second frame forming means is adapted for varying the number of, in particular neighbouring, data symbols used at a time onto which the data blocks of a mapping input data stream are mapped. Hence, at a time (preferably at each time), the number of data symbols onto which (preferably different) data blocks of a mapping input data stream are mapped, is generally not fixed (e.g. as in other embodiments where a predetermined number of, e.g. one or two, data segments are selected for mapping data blocks of a mapping input data stream), but is adaptable. Preferably, as provided for in another embodiment, the second frame forming means is adapted for varying the number of, in particular neighbouring, data symbols used at a time onto which the data blocks of a mapping input data stream from second frame to second frame and/or within a second frame are mapped. Thus, during the mapping the number of required data symbols (preferably neighbouring data symbols of neighbouring data segments) can be selected on the fly. For instance, if at a certain time only a low data rate is required (e.g. for transmitting still pictures only or coded video data with low amount of data), only a single data symbol might be sufficient, while at another time, at which a high data rate is required (e.g. for transmitting video data with a high amount of data, for instance due to a lot of motion in the video), two or more data symbols are selected for mapping two or more data blocks of the mapping input data stream onto them.

According to a further embodiment the second frame forming means is adapted for mapping the data blocks of a mapping input data stream onto a second frame such that they are spread in time and frequency over various data symbols and various data segments of said second frame. Hence, according to this embodiment, the data blocks of a mapping input data stream are not only mapped onto a single data segment or onto two or more data segments, but are mapped onto various, e.g. all, data segments of the second frame. In other words, time and frequency multiplexing is applied to the data blocks of a mapping input data stream providing time and frequency diversity increasing the overall robustness against different kinds of disturbances that might appear on the transmission channel, which is particularly important when considering the reception by mobile receivers. In addition, the data contained in the data blocks may be interleaved in advance, and generally the data are also protected by a forward error correction code, such as an UPC code.

Preferably, the second frame-forming means is adapted for selecting the bandwidth of said data segments of the payload portion of the second frames. Hence, the bandwidth may be variable and selected as needed, for instance according to the amount of data of a mapping input data stream to be mapped on the second frames. Alternatively, as proposed according to another embodiment, the data segments of the payload portion of the second frames may have a predetermined bandwidth, in particular an equal bandwidth, in all second frames. The latter embodiment requires less signalling since the receivers can be appropriately adapted in advance for reception of the known predetermined bandwidth.

Further, according to an embodiment the second frame forming means is adapted for mapping the data blocks of a mapping input data stream onto a second frame such that at each time at most one data symbol comprises a data block of a particular mapping input data stream. Hence, according to this embodiment a further improvement of time diversity is obtained further increasing robustness and a narrow-band receiver can detect this service.

Further, in an embodiment the second frame forming means is adapted for mapping the data blocks of a mapping input data stream onto a second frame such that the data blocks are irregularly mapped onto data symbols of the second frame. This embodiment also contributes to an increase of the robustness, in particular against regular disturbances. Irregular particularly means that there is no predefined or any regular mapping, e.g. that is periodic in time and/or frequency direction, of the data blocks of a mapping input data stream onto the data symbols both in time and frequency direction, e.g. a sequential sorted arrangement that could be susceptible to periodic disturbances.

Still further, in an embodiment the second frame forming means is adapted for mapping the data blocks of a mapping input data stream onto a second frame such that between data symbols carrying a data block of a particular mapping input data stream there is one or more data symbol in time direction carrying no data block of the same particular mapping input data stream. This embodiment also contributes to an increase of the robustness, but provides the further advantage that the receiver may fall into sleep mode and, thus, save power in between data symbols carrying data blocks of the mapping input data stream that shall be received, i.e. data symbols carrying no data blocks of the mapping input data stream that shall be received are not received or at least not completely processed in the receiver. Further, this provides the ability to the receiver to estimate the channel prior of fully waking up.

According to a preferred embodiment the second frame forming means is adapted for segmenting the preamble portion of the second frames into preamble segments all having an identical fixed bandwidth. This solution corresponds, as mentioned above, to the segmentation of the preamble portion as, for instance, described in the DVB-C2 standard according to which L1 blocks are provided in the preamble portion. In an embodiment the bandwidth of the preamble segments is equal to or larger than the bandwidth of the data segments. Alternatively, the bandwidth can also be smaller, e.g. if less signalling information must be put into the preamble segments. Generally, the bandwidth of both the preamble segments and the data segments is smaller than the receiver bandwidth.

In a further embodiment the second frame forming means is adapted for mapping substantially the same signalling data onto all preamble segments of the preamble portion of a second frame. Thus, the same signalling data is continuously provided in the preamble signalling blocks (which might slightly differ from each other, e.g. have different pilots and/or are differently scrambled), but enable a receiver always to be able to receive signalling data, irrespective to which data segment it is tuned. Hence, even if the tuning position of a receiver is not aligned to the frequency raster of the preamble segments, the receiver is able to obtain the signalling data by sorting the signalling data out of two adjacent preamble signalling blocks since the signalling data is preferably cyclically repeated within the preamble portion.

To enable the receiver to obtain all the required signalling information for receiving all the data blocks of the desired data stream, which is particular important if the data blocks are multiplexed in time and frequency direction and/or if they are irregularly mapped onto the second frame, various embodiments exist for informing the receivers accordingly.

According to one embodiment all the required signalling information could be put into the preamble signalling blocks. This, however, would require quite large preamble signalling blocks forcing the receiver to receive and process quite a lot of information which is not all required if only one particular data stream shall be received, i.e. the signalling data for the other data streams is not required and thus superfluous in such situation. This would also lead to time delays of the processing of the actual data to be received. On the other hand, one advantage would be that zapping could be faster, as all signalling information is already known.

Hence, according to a preferred embodiment the at least one preamble signalling block comprises only high level, rough signalling information about the mapping of the data blocks onto the data segments of the second frames and the second frame forming means is adapted for mapping payload portion signalling blocks comprising low level, more detailed signalling information about the mapping of the data blocks onto the data symbols of the second frames. According to this embodiment the main information for enabling the receiver to receive and process a particular data stream is provided in said payload portion signalling blocks, which can generally be regarded and processed by the second frame forming means as an own mapping input stream and which can thus be mapped onto the second frames in the same way as the other mapping input data streams. The information contained in the payload portion signalling blocks thus, for instance, contains the information about the code rate, modulation, number of subsequently arranged FEC-frames, the number of data blocks within a frame and the information about the location of the data blocks within the second frame. This information for a particular mapping input data stream can either be put into one payload portion signalling block and can be cyclically repeated, or it can be divided into several pieces of information distributed over multiple payload portion signalling blocks. The use of such payload portion signalling blocks mapped onto the payload portion provides the additional advantage that a time diversity of said payload portion signalling blocks can be provided resulting in a higher robustness of the signalling information. This signalling is similar to the IA signalling as done according to the DVB-T2 standard, whereby further or other parameters are included as needed.

To enable the receiver to find at least one payload portion signalling block the at least one preamble signalling block preferably comprises at least one pointer to a payload portion signalling block. Hence, the receiver first obtains said pointer from the preamble signalling block and then uses the pointer to find the payload portion signalling block by use of said pointer, obtains the signalling information contained therein which then enables the receiver to find the data blocks of the desired data stream. Hence, the preamble signalling blocks can be short since basically pointers and only some other general signalling information needs to be provided therein.

The provision and use of a pointer in the preamble portion is, however, not mandatory. For instance, according to an alternative embodiment, the position of the payload portion signalling block(s) is predefined and known a priori in the receiver, e.g. predefined in a standard or pre-programmed in the transmitter and all receivers.

In an even more elaborate embodiment it is proposed that the second frame forming means is adapted for mapping in-band signalling information comprising low level, more detailed signalling information about the mapping of data blocks of a particular mapping input data stream onto the data segments of the second frames into one or more of said data symbols, in particular into all data symbols carrying data blocks of said particular mapping input data stream. Hence, the concept of in-band signalling may additionally be used in the second frames. Said in-band signalling information may, for instance comprise the information where the next data block of the same mapping input data stream can be found. Thus, all this signalling information needs not to be decoded from the preamble signalling blocks and/or the payload portion signalling blocks, which thus only need to enable the receiver to find the first data block. If the receiver has decoded said data blocks it can also read the in-band signalling information contained therein enabling the receiver to find the next data block. This concept is preferably provided in the data blocks of all mapping input data streams mapped onto the second frames.

According to still another embodiment the second frame forming means is adapted for mapping payload portion signalling blocks onto data symbols of one or more particular second frames, wherein signalling information, in particular pointers, about the mapping of the data blocks onto the data symbols of one or more subsequent second frames, in particular the next second superframe, is included into said payload portion signalling blocks. Hence, in a frame all the required signalling information can be found by the receiver in the payload portion signalling blocks that are required to find all data blocks mapped onto one or more subsequent frames, i.e. a group of frames or the frames of a superframe. This requires for the receiver a bit more time for obtaining all the signalling information, but allows instant zapping of the receiver between all data streams without any waiting time for first obtaining the required signalling information. In other words, the signalling information is obtained in advance and without knowing if and which parts thereof all are really required by the receiver.

According to a further refinement the second frame forming means is adapted for including offset signalling information indicating changes of the mapping of the data blocks between said one or more particular second frames and said one or more subsequent second frames into in-band signalling information of a data block or into one or more payload portion signalling blocks mapped onto data symbols of said one or more particular second frames. Hence, at the end of a frame said offset signalling information can be mapped as in-band signalling information into one or more data blocks. Alternatively, said offset signalling information can be mapped into one or more payload portion signalling blocks. Said offset signalling information indicates how the signalling information changes from this (group(s) of) second frame(s) to the next (group(s) of) second frame(s) (or any other subsequent frame(s)) so that in the next (or subsequent) (group(s) of second) frame(s) all the signalling information must not necessarily be mapped into payload portion signalling blocks or must at least not be obtained by the receiver. In other words, mainly some offset information is mapped into the frames to save mapping space and time (in the receiver, which can be continuously tuned to the desired data stream and needs not access the payload portion signalling blocks again).

As mentioned above, the first frames may be formed in accordance with the DVB-T2 standard and the second frames may be formed in accordance with the DVB-C2 standard. The mapping input data streams can thus be regarded as physical layer pipes, wherein each physical layer pipe is segmented into subslices or bursts representing the above-mentioned data blocks, which carry error correction code encoded, interleaved data. The invention, however, is not limited to such embodiments and applications, but other frame structures and other kinds of mapping input data streams in other applications (using other standards or no particular standard) may be used as well.

In the above, the present invention has been illustrated with reference to embodiments where two different types of frames are mapped onto a mapping output data stream. According to another aspect of the present invention there is provided an apparatus and a corresponding method for mapping payload data of mapping input data streams onto a mapping output data stream having a channel bandwidth for transmission in a multi-carrier broadcast system, wherein said apparatus comprises:

a data input for receiving said at least two mapping input data streams each being subdivided into data blocks carrying payload data and for receiving signalling data, a frame forming means for mapping the data blocks of said at least two mapping input data streams onto frames of the frame structure of said mapping output data stream covering said channel bandwidth, each frame comprising a preamble portion and a payload portion, wherein the frame forming means is adapted for mapping the signalling data onto the preamble portion, which comprises at least one preamble symbol carrying at least one preamble signalling block including signalling data, and for mapping the payload data onto the payload portion comprising a plurality of data symbols carrying payload data of at least two mapping input data streams, said payload portion being segmented into data segments each covering a bandwidth portion of said channel bandwidth, wherein the data blocks of a mapping input data stream are mapped onto a frame such that they are spread in time and frequency over various data symbols and various data segments of said frame, and a data output for outputting said mapping output data stream.

Quite similar as mentioned above, according to further aspects of the present invention there is provided a transmission apparatus and a corresponding transmission method employing such a mapping apparatus and a computer program for implementing said mapping method.

It shall be understood that the apparatus, methods, computer program and frame structure according to these aspects have similar and/or identical preferred embodiments as explained above and as claimed in the dependent claims.

Hence, an essential aspect of the present invention according to which the data blocks of a mapping input data stream are mapped onto a frame such that they are spread in time and frequency over various data symbols and various data segments of the frame can generally also be applied if the mapping output data stream only comprises one type of frames and not only if, as explained above, a mapping output data stream comprises alternately arranged first and second frames of different types and having different frame structures. Thus, according to this aspect, the concept of segmentation of the available bandwidth which allows for reduced power consumption due to the application's narrowband receivers is also exploited, but a further time and frequency multiplexing of the data blocks (as explained above in a preferred embodiment of the frame structure of the second frames) is additionally applied to achieve the above explained advantages.

This aspect may find applications in multi-carrier broadcast systems in which a separate frame structure is defined for use by all receivers of a particular broadcast system. For instance, if a separate broadcast system with own definitions of the applied frame structure is used for mobile receivers, such a frame structure may be used.

BRIEF DESCRIPTION OF DRAWINGS

These and other aspects of the present invention will be apparent from and explained in more detail below with reference to the embodiments described hereinafter. In the following drawings

DESCRIPTION OF PREFERRED EMBODIMENTS

Figure 1:
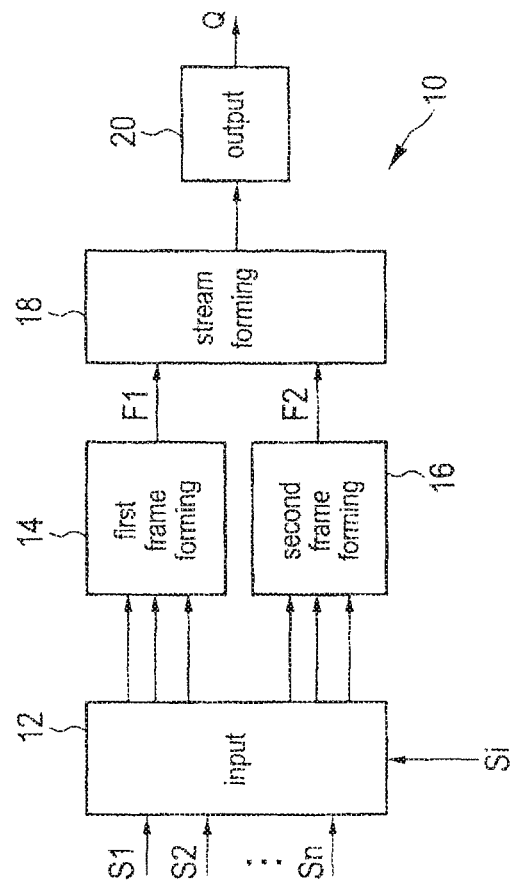
FIG. 1 shows a first embodiment of a mapping apparatus according to the present invention.

FIG. 1 shows a block diagram of a mapping apparatus 10 according to the present invention. The apparatus 10 is provided for mapping payload data of mapping input data streams S1, S2, . . . , Sn onto a mapping output data stream Q having a (predetermined) channel bandwidth for transmission in a multi-carrier broadcast system. The mapping input data streams S1, S2, . . . , Sn are each subdivided into data blocks (also called bursts, sub-slices or data patterns) carrying payload data, which are pre-processed by other elements of a transmitter as will be explained below. A data input 12 receives said mapping input data streams S1, S2, . . . , Sn. Further, signalling data S1 are received by said data input 12.

For frame forming and mapping the data blocks of received mapping input data streams onto frames two different frame forming units 14 and 16 are provided. A first frame forming unit 14 maps the data blocks of a first group of mapping input data streams, e.g. of mapping input data streams S1, S2 and S3, onto first frames F1 having a first frame structure also covering the total channel bandwidth. In addition, the signalling data S1 are incorporated into said first frames F1 for signalling the required data to receivers of a first type that are adapted for receiving and processing said first frames F1.

A second group of mapping input data streams, e.g. the mapping input data streams S1, S4 and S5, are provided to the second frame forming unit 16 which maps them onto second frames F2 having a second frame structure covering the total channel bandwidth. The second frame structure is generally different from the first frame structure, and the second frames F2 are generally provided for reception and processing by different types of receivers. Also the second frame forming unit 16 uses signalling data S1 for incorporation into the second frames F2 for use by the receivers. Those frames F1, F2, in particular both sequences of first frames F1 and second frames F2 generated by the first frame forming unit 14 and the second frame forming unit 16, are then further processed by a stream forming unit 18 which alternately arranges one or more first frames F1 and one or more second frames F2, thus forming the mapping output data stream Q. Said mapping output data stream is then outputted by a data output 20 for further processing and/or transmission.

Figure 2:
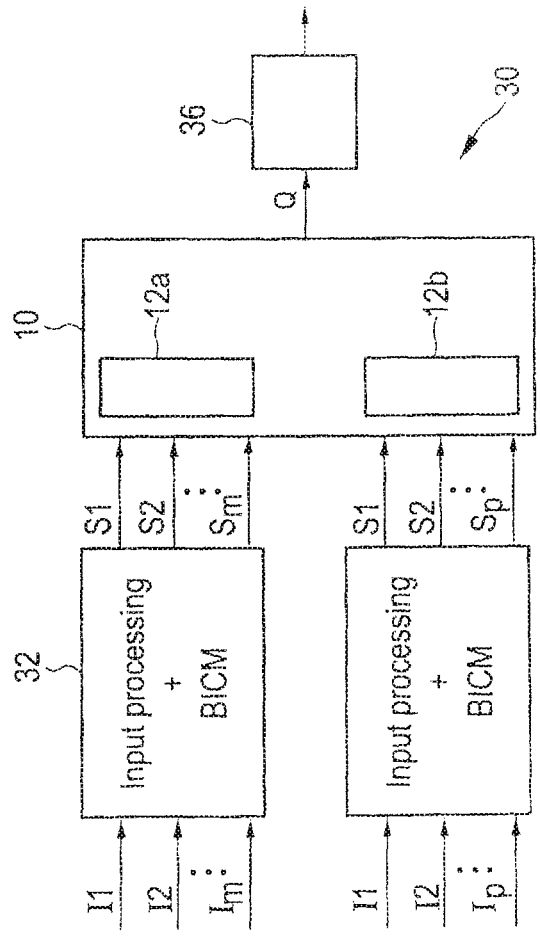
FIG. 2 shows a first embodiment of a transmitter according to the present invention.

FIG. 2 shows a block diagram of a transmitter 30 according to the present invention, in which a mapping apparatus 10 as explained above is used. FIG. 2 particularly shows an exemplary embodiment of a transmitter 30 which, however, shall not be understood as limiting the application of the present invention.

The transmitter 30 comprises a first pre-processing unit 32 and a second pre-processing unit 34. The first pre-processing unit 32 receives transmitter input data streams I1, I2, . . . , Im and pre-processes them to obtain the mapping input data streams S1, S2, . . . , Sm. The transmitter input data streams I1, I2, . . . , Im may, for instance, be one or more (e.g. MPEG-2) transport streams) and/or one or more generic stream(s), and the data may be carried therein in individual Physical Layer Pipes PLPs.

The first pre-processing unit 32 is, in this exemplary embodiment, adapted in accordance with the DVB-T2 standard and comprises elements for input processing and Bit Interleaved Coding & Modulation (BICM). Such means may include means for CRC encoding, header insertion, padding insertion, scrambling, FEC encoding (LDPC/BCH) bit interleaving, bit to cell demultiplexing, cell to constellation mapping, constellation rotation and cyclic Q-delaying, cell interleaving and time interleaving, just to name a few elements that are generally provided as explained in detail in the DVB-T2 standard. Those elements are commonly known and described in detail in the DVB-T2 standard so that no further explanations are provided here.

The second pre-processing unit 34 is, in this exemplary embodiment, adapted for pre-processing the received transmitter input data streams I1, I2, Ip, which may be different from, partly equal or completely equal to the transmitter input data streams I1, I2, . . . , Im (which depends mainly on the kinds of services provided to the different types of receivers). In an embodiment, said pre-processing may be performed in the same or in a similar way as described in the DVB-T2 standard (or, alternatively, in the DVB-C2 standard), possibly with additional adaptions according to the needs of the desired application. Hence, said pre-processing unit 34 comprises, in this exemplary embodiment, means for input processing and Bit Interleaved Coding & Modulation (BICM). Said means may particularly comprise means for input stream synchronization, null packet detection, CRC-encoding, header insertion, scrambling, FEC (BCH/LDPC) encoding, bit interleaving, bit to cell demultiplexing, cell to constellation mapping and frame header insertion. Again, these means are generally known and described in detail in the DVB-T2 standard and the DVB-C2 standard so that no further explanations are provided here.

It shall be noted that any time reference is made to any standard herein, the various explanations provided in the cited standard, particularly in the DVB-T2 standard and the DVB-C2 standard, to which reference has been made above and will be made below, are herein incorporated by reference herewith.

The output of the first and second pre-processing units 32, 34 are then provided as mapping input data streams S1, S2, . . . , Sm and S1, S2, . . . , Sp to the mapping apparatus 10, which is generally adapted as explained above with respect to FIG. 1. In the particular embodiment shown in FIG. 2, however, the data input 12 is split-up into two data input subunits 12a, 12b for respectively receiving the mapping input data streams from the first pre-processing unit 32 and the second preprocessing unit 34. The mapping output data stream is then provided to a transmitter unit 36 for transmission, in particular by a broadcast, after further processing, where necessary.

Figure 3:
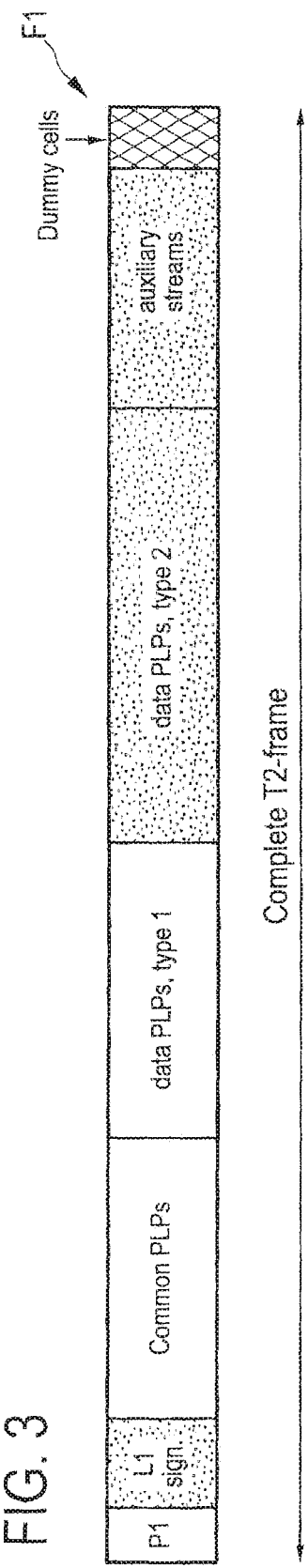
FIG. 3 shows the structure of a complete T2-frame.
Figure 4:
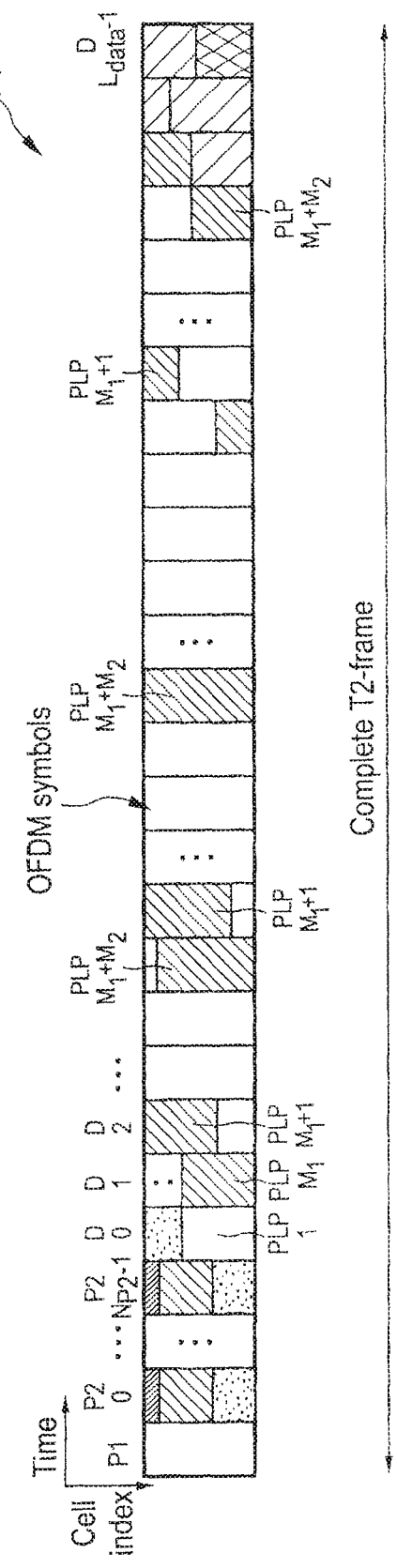
FIG. 4 shows more details of the structure of a complete T2-frame.
Figure 5:
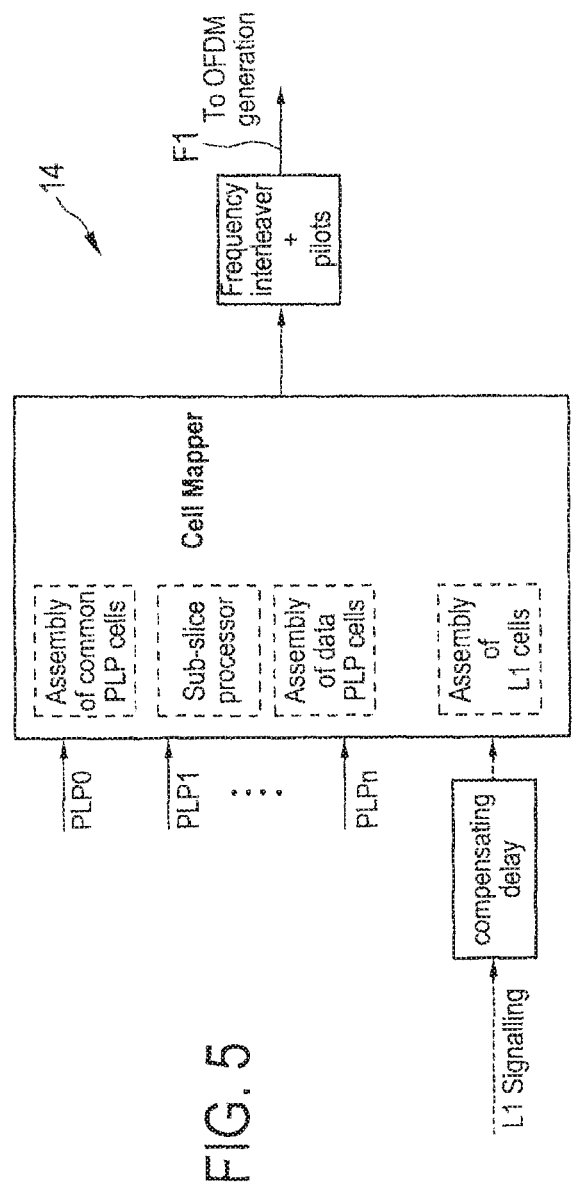
FIG. 5 shows an embodiment of a frame forming unit in accordance with the DVB-T2 standard.

Next, frame forming in the first frame forming unit 14 shall be explained. If applied in transmitter 30 as depicted in FIG. 2, the first frame forming unit 14 is also adapted to process the received mapping input data streams S1, S2, . . . , Sm in accordance with the DVB-T2 standard. Hence, generally the first frame forming unit 14 comprises a cell mapper, which assembles modulated cells of PLPs and signalling information into arrays corresponding to OFDM symbols. Hence, frames are formed (generally called "T2-frames") as schematically depicted in FIG. 3 and in more detail in FIG. 4. Such a T2-frame comprises one P1 preamble symbol, followed by one or more P2 preamble symbols, followed by a configurable number of data symbols. Thereby, PLPs are classified into three types, in particular common PLP, data PLP type 1 and data PLP type 2. An exemplary embodiment of the first frame forming unit 14 is depicted in FIG. 5. More details about the T2-frame structure and the mapping of PLPs (generally referred to herein as mapping input data streams) can be found in the UVB-T2 standard and shall thus not be provided here.

Figure 6:
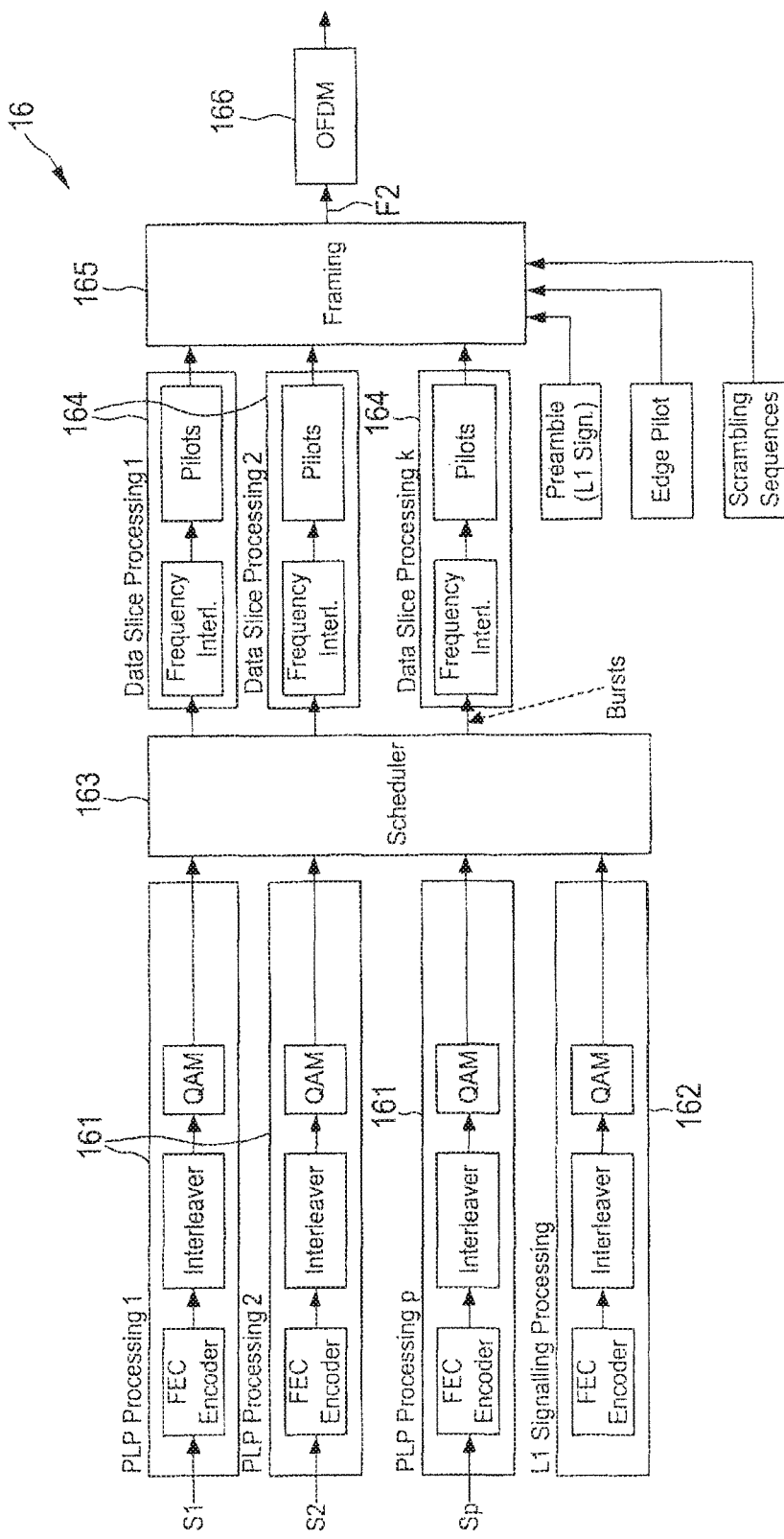
FIG. 6 shows a block diagram of a frame forming unit in accordance with the present invention.

A block diagram of an embodiment of the second frame forming unit 16 is schematically depicted in FIG. 6. For each of the p mapping input data streams (PLPs) S1, S2, . . . , Sp received by the second frame forming unit 16 a separate PLP processing unit 161 is provided, each generally comprising a FEC-encoder, an interleaver, and a QAM-modulator (optionally with rotated constellations). The MIMO (Multiple Input Multiple Output) mode is generally fixed for all data streams S1, S2, . . . , Sp. Further, a signalling processing unit 162 is provided for processing of signalling information, which signalling processing unit 162 generally comprises the same elements as the PLP processing units 161. The processed PLPs and the processed signalling data are then provided to a scheduler 163 whose task is the mapping of the time interleaving blocks of the several PLPs onto the frame structure. Therefore, the scheduler 163 divides the time interleaving blocks into bursts (generally called data blocks). These bursts are then mapped onto the OFDM symbols (generally called data symbols) in the different data slices (generally called data segments). The length of each burst is preferably a multiple of the number of useful OFDM subcarriers per data slice. The data slices, more precisely the bursts of the data slices, are then provided to data slice processing units 164, each comprising a frequency interleaver and a pilot insertion unit. The data slice processing uses the data received from the scheduler 163 and creates the complete OFDM symbol for the corresponding data slice. It performs a pairwise frequency interleaving and preferably adds all pilots, i.e. the scattered and continual pilots for channel estimation and synchronization, wherein generally the pilot scheme is identical for all data slices. Preferably, the bandwidth of the data slices is a multiple of 24, which ensures a constant number of payload OFDM subcarriers (generally per four (temporally) consecutive segments).

The output from the data slice processing units 164, the preamble, edge pilots and scrambling sequences, are then provided to a framing unit 165, which assembles the different data slices and the preamble to the complete framing structure to be used for the second frames F2. Furthermore, it adds the edge pilot next to the highest OFDM subcarrier. Additionally, it performs the scrambling of the data. Finally, an OFDM modulator 166 may be provided for OFDM modulation.

In an embodiment for each mapping input data stream a buffer (not shown) is provided, e.g. in the PLP processing units 161 just before the input to the scheduler 163. These buffers are filled with the data blocks of the respective mapping input data stream. The scheduler accesses the buffers, and when sufficient data blocks are stored in a buffer, e.g. for completely filling a data segment of the frame, these data blocks are taken from the buffer by the scheduler and provided to the subsequent data slice processing unit 164 and the framing unit 165 for further processing and mapping onto the frame as desired.

Figure 7:
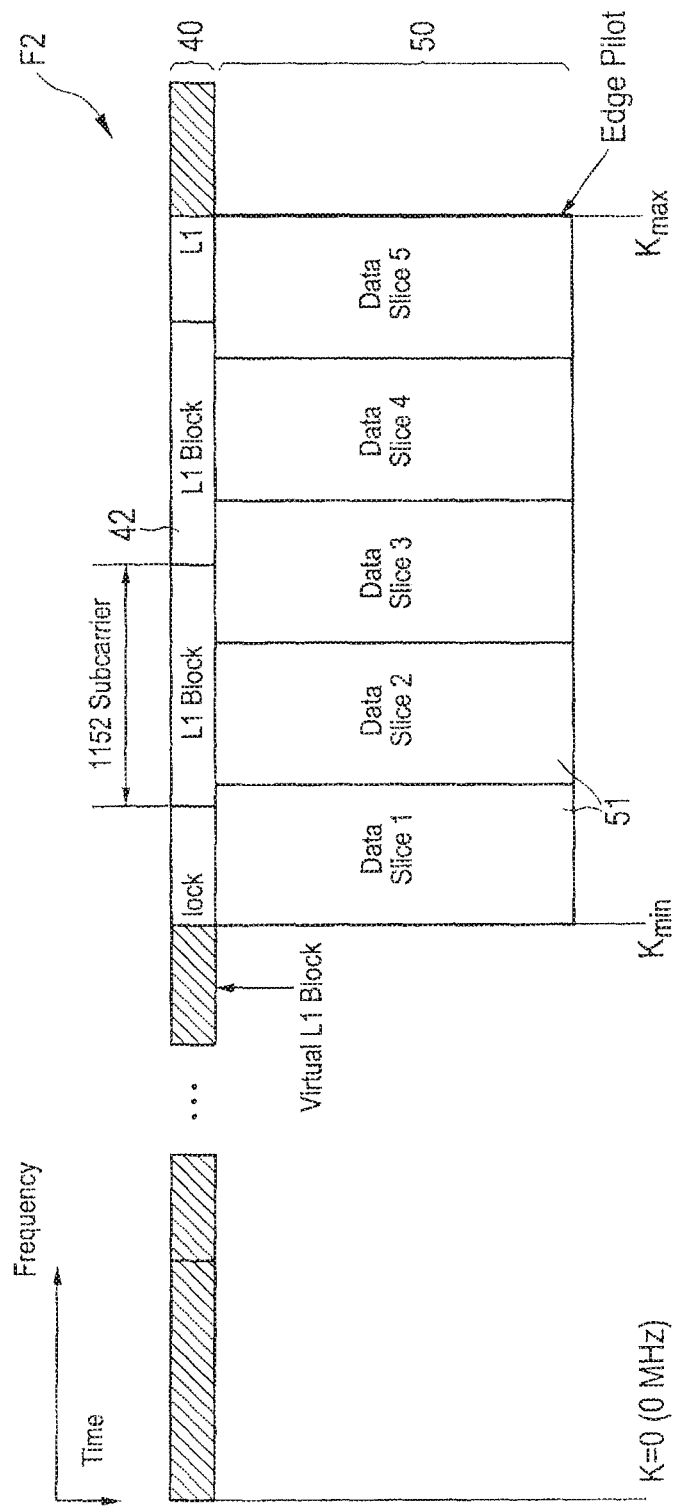
FIG. 7 shows a first embodiment of the frame structure of a second frame.
Figure 8:
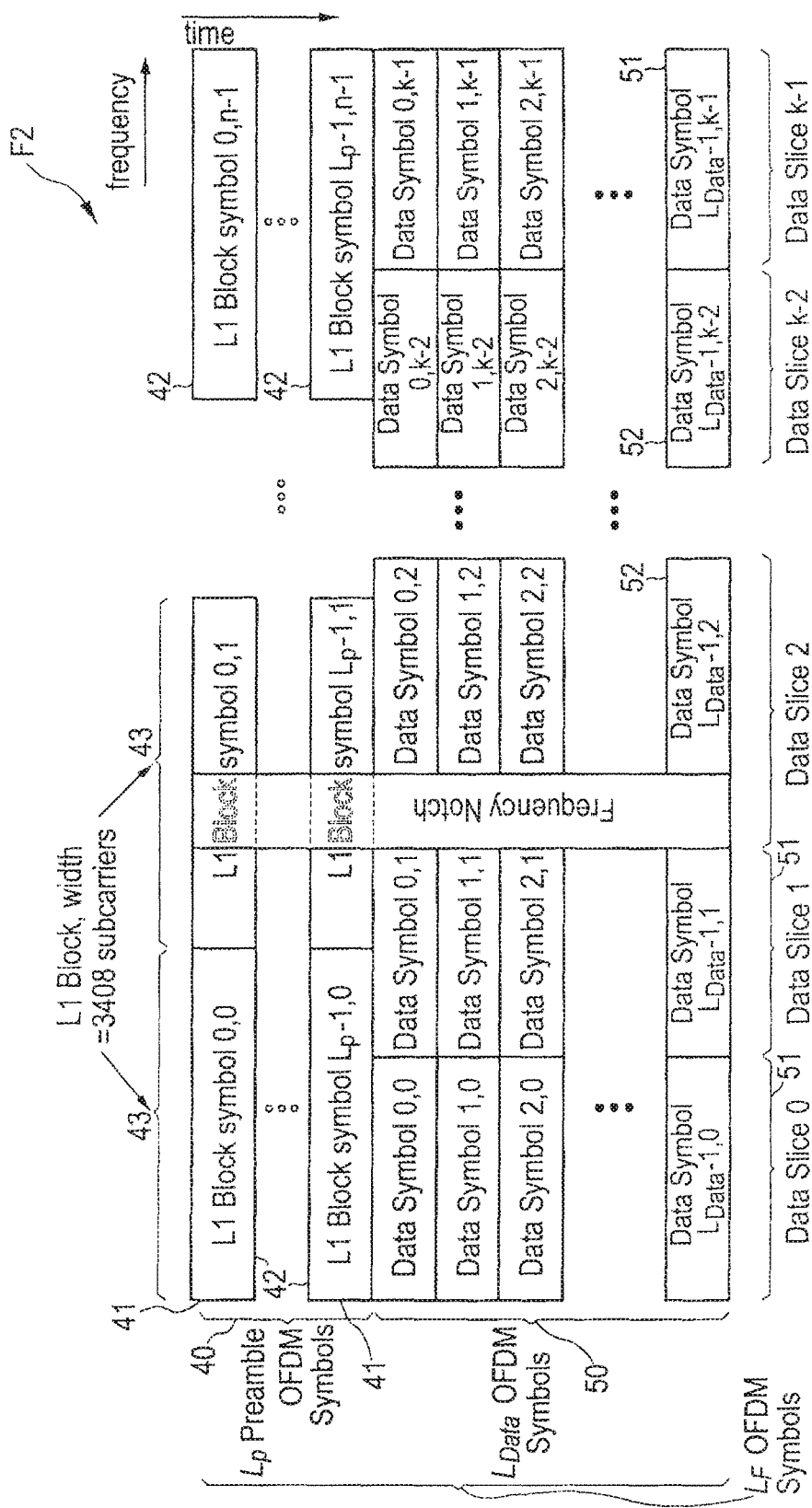
FIG. 8 shows more details of the first embodiment of the frame structure of a second frame.

The frame structure of the second frames F2 as generated by such an embodiment of the second frame forming unit 16 is schematically depicted in FIG. 7 and in more detail in FIG. 8.

These figures show the frame structure of the second frame F2 as defined in the DVB-C2 standard. This frame structure uses the concept of absolute OFDM, according to which all frequencies are aligned to the absolute frequency 0 MHz, which is identical to the OFDM subcarrier index k=0. The OFDM subcarrier frequencies of the following OFDM subcarriers are given by $f=(1/T_u)\cdot k$, where $T_u$ is the duration of the useful OFDM symbol part. Hence, the start and stop frequencies of the signal can also be given in OFDM subcarrier indices instead of a middle frequency of the signal. The start and the stop frequency are given by $K_{min}$ and $K_{max}$, respectively. It shall be noted, however, that the used of absolute OFDM is not essential for the present invention.

For the present invention, it is important to note that the concept of absolute OFDM can be used, but must not necessarily be used. For instance, in an embodiment, both the first and second frames F1, F2 are aligned to a frequency raster and use the concept of absolute OFDM, whereas in another embodiment both the first and second frames F1, F2 are not aligned to a frequency raster and do not use the concept of absolute OFDM. The second frames F2, however, make use of the concept of segmented OFDM as illustrated in FIGS. 7 and 8, while the first frames F1 generally do not make use of this concept (but could also use it in certain embodiments).

The frame F2 has a preamble portion 40 and a payload portion 50. The signalling data are mapped on the preamble portion 40, which comprises (in time direction) one or more preamble symbols 41 (e.g. $L_p$ preamble symbols 41 as shown in FIG. 8). Each preamble symbol 41 carries (in frequency direction) one or more preamble signalling blocks 42 (also called L1 block symbol) which carry the signalling data, i.e. the same signalling data are included therein and are thus periodically repeated, although the signalling blocks 42 are not completely identical, e.g. due to the use of different pilots therein.

The payload portion 50 is segmented into data segments 51 (also called data slices, e.g. 5 data slices as shown in FIG. 7 or k data slices as shown in FIG. 8. Each data segment 51 carriers a number of data symbols 52, e.g. $L_{Data}$ data symbols as shown in FIG. 8). Onto these data symbols the data blocks of the various mapping input data streams S1, S2, . . . , Sp are mapped. Various embodiments of said mapping will be explained in more detail below.

As can also be seen from FIGS. 7 and 8 the preamble segments 43, into which the preamble portion is segmented in frequency direction, all have an equal bandwidth which is equal to or larger than the bandwidth of the data segments 51. There is also no necessity of any alignment of the beginning of the preamble segments 43 with the beginning of the data segments in a frequency domain. Hence, a transmitter may also only transmit two partial preamble signalling blocks 42, for which the receiver can create a complete preamble signalling block if it knows where these preamble signalling blocks begin.

Figure 9:
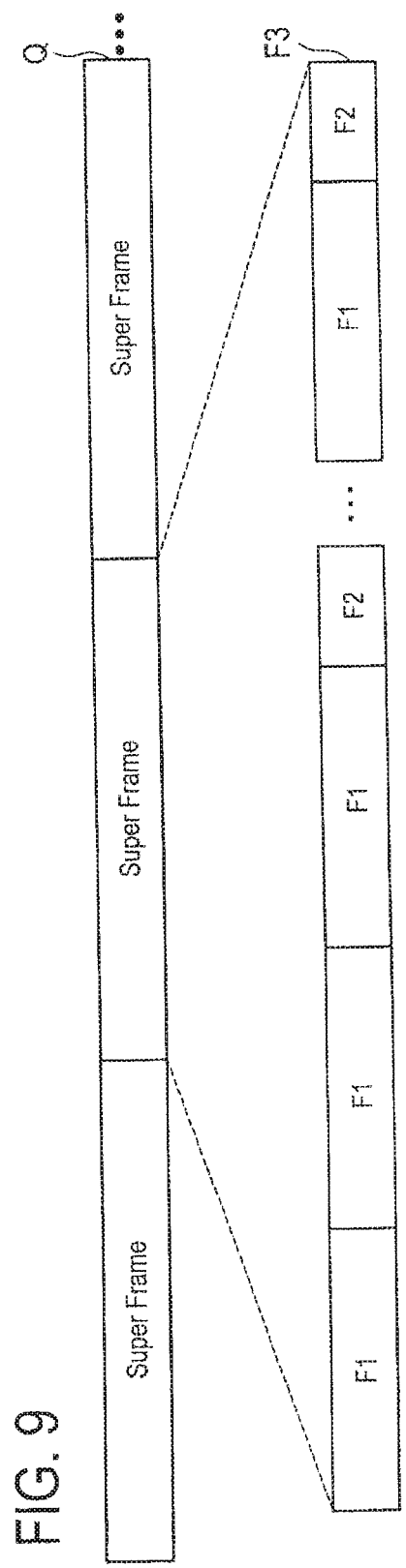
FIG. 9 shows the structure of a superframe as used according to the present invention.

FIG. 9 shows a superframe structure that is formed by the stream forming unit 18 from the first and second frames, F1, F2. In particular, by alternately arranging one or more first frames F1 and one or more second frames F2 said superframe structure is formed. The sequence of said superframes F3 then represents the mapping output data stream Q outputted by the stream forming unit 18 via the data output 20.

Adopting the superframe structure as defined in the DVB-T2 standard the first frames F1 represent the T2-frames, and the second frames F2 are placed into the parts reserved for the FEF frames. For instance, in a practical embodiment the F1 frames (formed in accordance with the DVB-T2 standard) are provided for reception by stationary receivers (e.g. in accordance with the DVB-T2 standard), and the second frames F2 (e.g. formed in accordance with a DVB-C2 standard or according to any new rules) are provided for reception by mobile receivers (e.g. according to the upcoming DVB-NGH standard).

Next, embodiments for mapping the data blocks of a mapping input data stream onto the second frame F2 shall be explained. In a first embodiment, which is generally in consistence with the frame structure defined in the DVB-C2 standard, the data blocks of a particular mapping input data stream are mapped onto a single data segment or two or more (neighbouring or not neighbouring) data segments. For instance, referring to FIG. 7, all data blocks of a particular mapping input data stream are thus mapped on (for instance) data slice 1 or data slices 1 and 2. This has the advantage that the receiver tuning position can be kept fixed once the receiver has tuned to the data segment it wants to receive.

Figure 10:
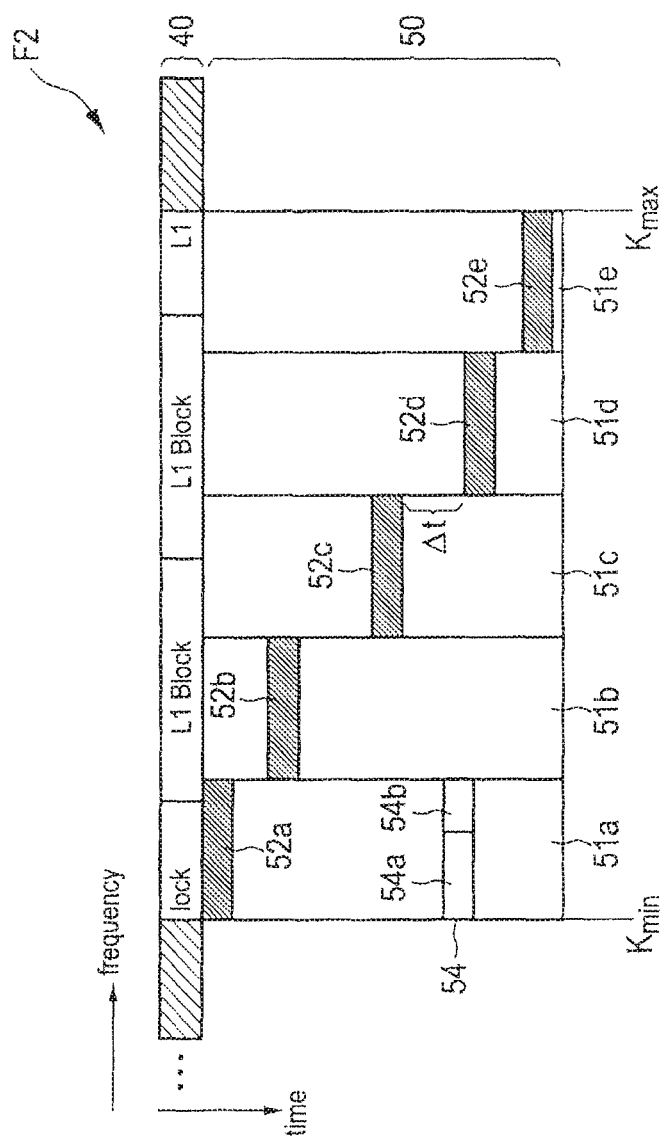
FIG. 10 shows a second embodiment of the frame structure of the second frame.

According to another embodiment as schematically depicted in FIG. 10, the data blocks of a particular mapping input data stream are spread in time and frequency over various data symbols and various data segments. For instance, the data symbols 52a-52e indicated in FIG. 10 carry data blocks of a particular mapping input data stream and are spread in frequency over the five data segments 51a-51e and in addition in time so that at each time only one data segment carries a data symbol containing data of said particular mapping input data stream. This provides the advantage of an increased robustness due to increased time and frequency diversity. Of course, the tuner of the receiver has to wake up slightly earlier for channel estimation if the data blocks of the data stream it wants to receive are spread over various data segments. If time-slicing (as in DVB-H or DVB-T2) is applied, this problem always occurs. However, the retuning to new frequencies should only induce a small overhead in processing and power consumption (compared to always-on and full-bandwidth tuning).

In a single data segment data blocks belonging to various mapping input data streams can thus be transmitted according to this embodiment of the present invention. These data blocks may be pre-processed in the same manner, but also in different manner (e.g. with different MODCODs) to provide different levels of robustness to the different mapping input data streams.

While it is generally possible, that at a particular time also more than one data symbols (i.e. from different data segments) carry a data block of the same mapping input data stream, the embodiment shown in FIG. 10 is preferred since in this case receivers with smaller bandwidths can be used.

The mapping structure of the data blocks of a particular mapping input data stream can be kept regular, as shown in FIG. 10, but is preferably selected irregular, i.e. the data blocks are preferably spread irregularly over the data symbols of the second frame F2 and not according to any regular (e.g. periodic) pattern in time and/or frequency. This also contributes to an increased robustness, particularly against regular disturbances. This requires an increased amount of signalling information needed for the receiver to find the data symbols of the mapping input data stream to be received. For this problem, however, several solutions exist as will be explained below.

Further, time gaps are preferably introduced between data blocks of a mapping input data stream, during which no data symbol of any data segment carries a data block of said particular mapping input data stream. For instance, as shown in FIG. 10, there is a time gap Δt between the data symbols 52c and 52d, during which other data symbols are provided, which, however, do not carry data blocks of the mapping input data stream whose data blocks are carried in the data symbols 52a-52e. This provides the advantage that a receiver might fall into sleep mode during this time gap Δt to save power. Generally, said time gap Δt is preferably large enough to allow the receiver to fall into sleep mode, wake up timely and re-tune, but it might differ from data symbol to data symbol. It is at least large enough to allow the receiver to re-tune.

The bandwidth of the data segments 51 may be kept equal and predetermined, as shown in FIG. 10. However, in other embodiments the bandwidth of the individual data segments 51 may be variable or may be determined as needed. For instance, if a mapping input data stream has only a low amount of data compared to other mapping input data streams a data segment might be used having a smaller bandwidth for said mapping input data stream.

According to still another embodiment of the mapping, the map-ping of data blocks of a particular mapping input data stream may be kept constant within a particular frame F2, but may be changed from frame F2 to the next frame F2, i.e. a frequency hopping may be provided from frame to frame (or from a first group of frames to the next group of frames), but not within frames.

According to still another embodiment a data block can be split up in frequency direction for use by data symbols from different mapping input data streams. This is illustrated in FIG. 10 by use of data symbol 54. In this example, the data symbol is split up into a first partial data symbol 54a, onto which a first (possibly partial) data block from a first mapping input data stream is mapped, and a second partial data symbol 54b, onto which a second (possibly partial) data block from a second mapping input data stream is mapped. This, for instance, makes sense if the total data symbol 54 cannot be filled by a complete data block from the first mapping input data stream because not enough data are currently available).

Next, various embodiments for signalling the required signalling information about the mapping of the data blocks onto the data segments and the data symbols of the second frames shall be explained. In a first embodiment only the preamble signalling blocks comprise all the signalling information required for a transmitter to receive and demap all the intended data blocks. This embodiment would, however, require that the preamble signalling blocks are quite large (in frequency and/or time), since the preamble has typically a high pilot density for robust channel estimation and synchronization leading to the result that less signalling capacity is available in the preamble. Hence, putting a lot of signalling information into the preamble signalling blocks would further increase their size, which is generally not preferred.

Figure 11:
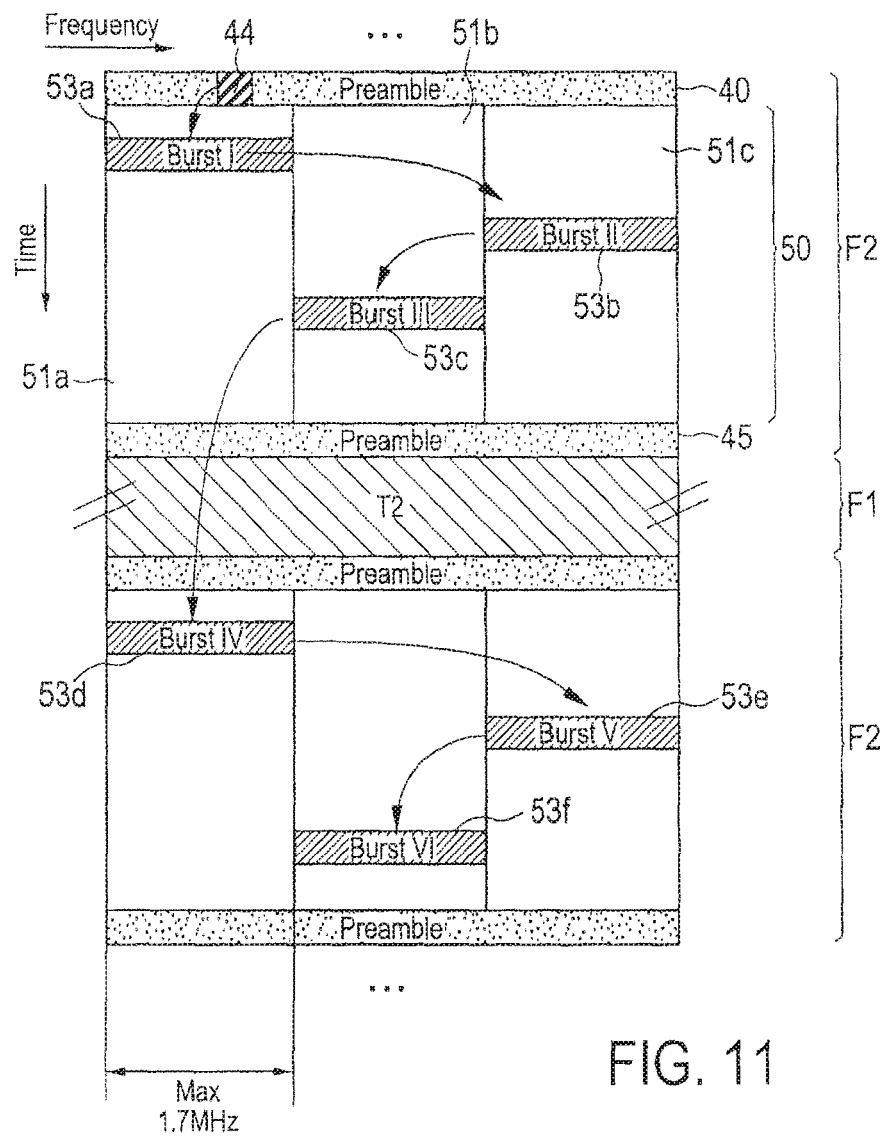
FIG. 11 shows a first embodiment for mapping signalling information into the second frames.

In another embodiment, illustrated in FIG. 11, where a second frame F2 is shown having a preamble portion 40 and a another preamble portion 45 (often also referred to as "postamble"; generally contains the same information as the preamble portion 40, but indicating that it is another preamble portion, i.e. a "postamble portion"), the signalling principle is based on two steps. The preamble signalling blocks according to this embodiment comprise only high level, rough signalling information about the mapping of the data blocks onto the data segments. This high level signalling information may correspond to the signalling parameters that are generally transmitted in the initial layer 1 blocks, as commonly done according to the DVB-T2 or DVB-C2 standard. This high level information may, for instance, comprise information about the bandwidth of the data segments in the payload portion, the used pilot patterns, the guard interval etc. In addition, it comprises preferably a pointer block 44 including at least one pointer to at least one payload portion signalling block 53, which is provided in the payload portion 50 and which comprises low level, more detailed signalling information about the mapping of the data blocks onto the data symbols of the second frame. This payload portion signalling block 53a shown in FIG. 11 thus requires sufficient information for the receiver to find and decode the data symbols carrying data blocks of the desired data stream. Further, a pointer to the next payload portion signalling block 53b may be included which comprises further information, particularly regarding the location of subsequent data symbols carrying payload data.

As shown in FIG. 11 each payload portion signalling block 53a-53f points to the next payload portion signalling block, which payload portion signalling blocks can thus be mapped and decoded basically in the same way as the data blocks carrying actual payload data. The pointer from one payload portion signalling block to the next payload portion signalling block may also point across other frames F1 located in between two second frames F2.

According to another embodiment multiple pointers are included in the pointer block 44, which point to several payload portion signalling blocks, e.g. to the payload portion signalling blocks 53a-53c. After deinterleaving and decoding said payload portion signalling blocks 53a-53c sufficient low level signalling information and location information (e.g. pointers) for finding the next set of payload portion signalling blocks 53d-53f as well as the next group of data blocks. Thus, according to such an embodiment, a set of pointers is transmitted during several bursts (i.e. payload portion signalling blocks) and provides information on the next bursts (i.e. payload portion signalling blocks) of the following set as well as the next data blocks.

Figure 12:
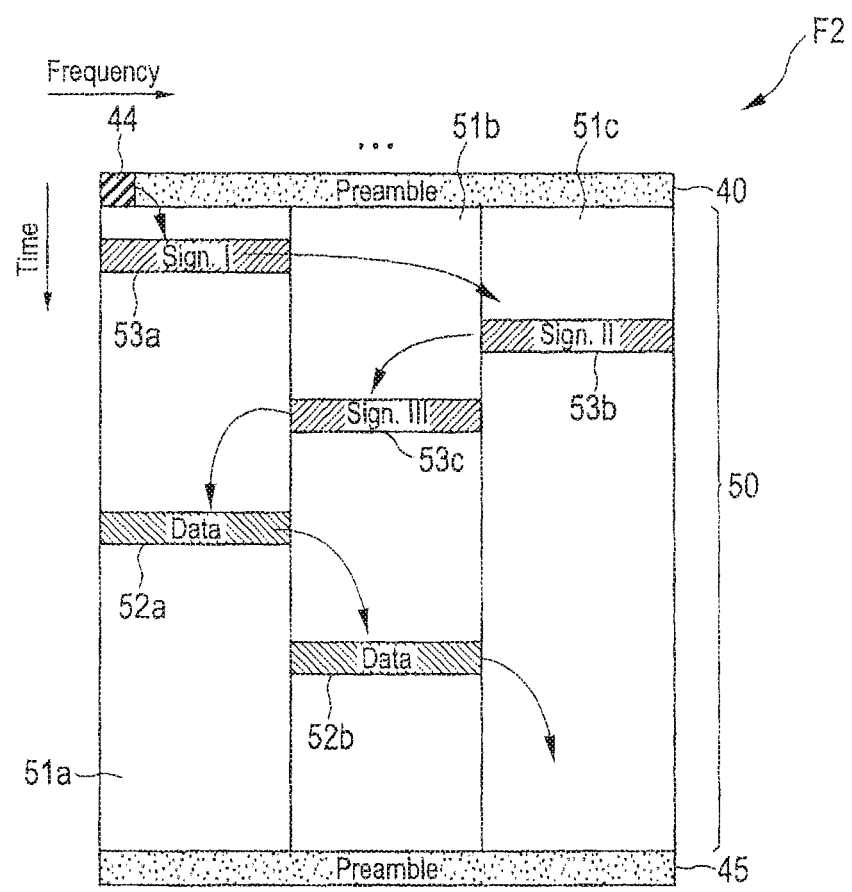
FIG. 12 shows a second embodiment for mapping signalling information into the second frames.

Another embodiment for signalling shall be explained with reference to FIG. 12 showing a single second frame F2. According to this embodiment the signalling principle is based on three steps. Firstly, as mentioned above, the preamble signals the position of at least the first payload portion signalling block 53a provided in the payload portion 50. For this purpose, again, the preamble may comprise a pointer 44. The receiver is then able to decode the (one or more) payload portion signalling block(s) 53a (53b, 53c), which carries the data required for decoding the data blocks of the mapping input data streams. Preferably, the payload portion signalling blocks are mapped onto the frame F2 and transmitted similar to the data blocks carrying payload data, which allows for long time interleaving and robustness.

Still further, according to this embodiment, at least one of said payload portion signalling blocks 53a-53c (or the whole set together, in particular after deinterleaving and decoding) provides information, in particular a pointer, by which the receiver finds at least the first data block 52a (or the group of next data blocks) of the desired data stream. Said data block 52a does not only contain the actual payload data, but also contains in-band signalling information comprising low level, more detail signalling information about the mapping of the data blocks of said particular mapping input data stream onto the data segments of the frames. This in-band signalling information thus enables the receiver to find the next data block 52b of the same data stream. Hence, from this moment on the receiver is no longer obliged to receive and decode the signalling information comprised in the preamble and/or in the payload portion signalling blocks, but the in-band signalling information contained in the data blocks 52a, 52b, . . . is sufficient for finding all data blocks of the desired data stream and maybe also of other "related" data streams (for enabling faster zapping to related services).

According to a modification of said embodiment, not each single data block contains sufficient information for finding the next data block, but several data blocks 52a, 52b are treated as a unit. Only after deinterleaving and decoding all of them, the in-band signalling information is available including information about the next "unit" (i.e. group of data blocks).

Hence, generally the receiver is not obligated to receive the preamble or the payload portion signalling blocks, which may again be considered as a separate signalling data stream mapped onto the payload portion of the frame. However, if the position of the data blocks is not known at the time the current mapping input data stream was encoded, it can also point to the position of the next payload portion signalling block. It shall be noted that the payload portion signalling blocks do generally not only comprise signalling information for a single mapping input data stream, but for all mapping input data streams.

Hence, according to this embodiment the signalling information specific to a particular mapping input data stream is provided in-band in the data blocks of said mapping input data streams, e.g. attached at the beginning or at the end of the data blocks. It is also possible to interleave said signalling information together with the FEC-encoded data blocks by a common interleaver, or the signalling information may be combined with the encoded payload data (either completely at the beginning or end or sub-divided into several portions), and then a common FEC-encoding followed by interleaving is performed, preferably by use of a common interleaver, i.e. over multiple FEC-coded blocks. This provides the advantage of longer time diversity and, after the separation into various data segments, also more frequency diversity.

Figure 13:
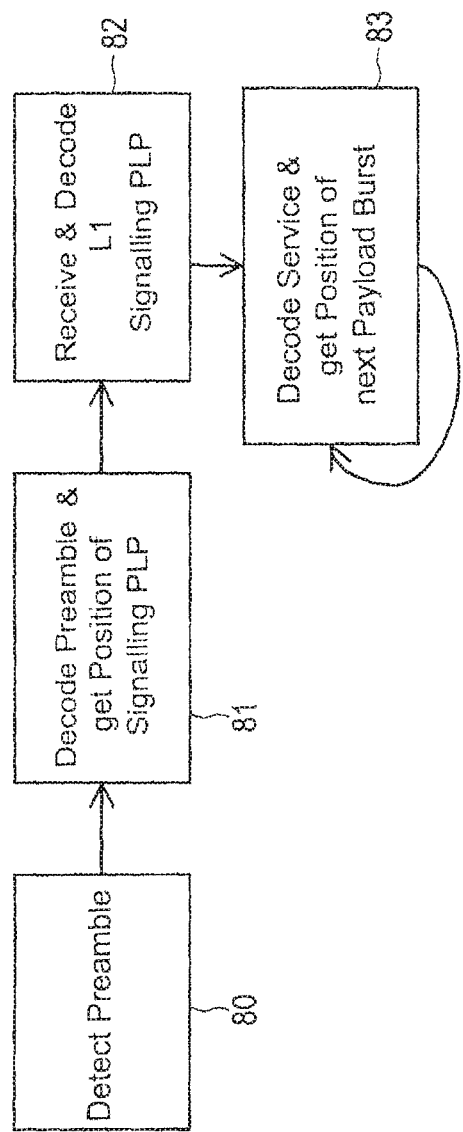
FIG. 13 illustrates the steps of the method performed by a receiver for obtaining signalling information.

A simple block diagram illustrating the steps for retrieving of the signalling information in the receiver, if the signalling information is mapped onto the frame F2 as illustrated in FIG. 12, is shown in FIG. 13. In a first step 80 the preamble is detected, which is mainly used for initial synchronization to the data stream to be received. A pointer in the preamble points to the next payload portion signalling block, whose position is obtained in step 81 by decoding the preamble, at least the pointer included therein. In this embodiment the payload portion signalling blocks are mapped onto the frame F2 like a normal mapping input data stream and are also called "signalling PLP". In step 82 this payload portion signalling block of the signalling PLP is received and decoded. Afterwards, the complete signalling is done in-band, i.e. within the mapping input data stream itself. Hence, in step 83, the service and the position of the next data block (also called payload burst) is obtained and decoded.

It shall be noted that the same principles and the same embodiments for signalling information can be used if the pointer unit 44 is included in the other preamble 45 (i.e. the postamble) of a frame.

The preferred embodiment of a receiver only needs to obtain the signalling information stored in a preamble portion, then accesses a payload portion signalling block a single time, and from then on uses only the in-band signalling information. The in-band signalling information preferably includes a pointer to the next data block of the data stream and to the next payload portion signalling block (which is useful if a payload portion signalling block is provided in every frame of the same type, but is otherwise not needed since then enough preamble symbols are in between from which the signalling information can also be provided in some embodiments). Only, if the receiver wants to switch to another service, a payload portion signalling block has to be accessed again a single time to obtain the required signalling information related to the new service.

An example of the signalling information that can be included in the payload portion signalling blocks is illustrated in the following table, where the entries are either self-explaining, or as defined in the T2 standard, or as described below:

the Frame Number enumerates the second frame (F2), in which the last burst of the signalled data falls;

MIMO MODE and PILOT PATTERN are in general fixed for parameters for a group of frames and indicate the applied MIMO scheme and pilot pattern, respectively;

NUM_ASSOCIATED_PLPs gives the number of PLPs, which are associated to a particular PLP (e.g. one PLP with basic FEC encoded data, another one with incremental redundancy for the basic FEC);

NUM_BURSTS is the number of data blocks of one time interleaver frame;

FRAME_NUMBER enumerates the next second frame (F2), which includes one or several bursts of the particular PLP;

Intrasymbol Pointer indicates for the first burst of a time interleaver frame the first active cell within the signalled data segment (which is not necessarily at the beginning, as described above);

DATA_SLICE_ID and OFDM_SYMBOL_NO are the pointers to the different burst.

| Field | Size |
| --- | --- |
| Frame Number (of last burst) | |
| Number of PLPs | 8 bit |
| For each PLP { | |
| PLP ID | 8 bit |
| QAM_MODE (incl. Const Rotation) | |
| FEC_MODE (fec coderate and length) | |
| MIMO_MODE | |
| PLP_TYPE | |
| PLP_PAYLOAD TYPE | |
| NUM_ASSOCIATED_PLPs | |
| For NUM_ASSOCIATED_PLPs { | |
| PLP_ID | |
| Type of association | |
| } | |
| NUM_BURSTS | |
| FRAME_NUMBER | |
| Intrasymbol Pointer to first burst | |
| For i=0.. NUM_BURSTS−1 { | |
| DATA SLICE_ID | 4 bit |
| OFDM_SYMBOL_NO | 8 bit |
| If (Associated_PLP) | |
| ASSOCIATED_PLP_ID (remaining part signalled in num_assoc_plp-loop) | 3 bit |
| } | |
| TIME_INTERLEAVING_TYPE | |
| TIME_INTERLEAVER DEPTH | |
| CRC32 | 32 bit |

Figure 24:
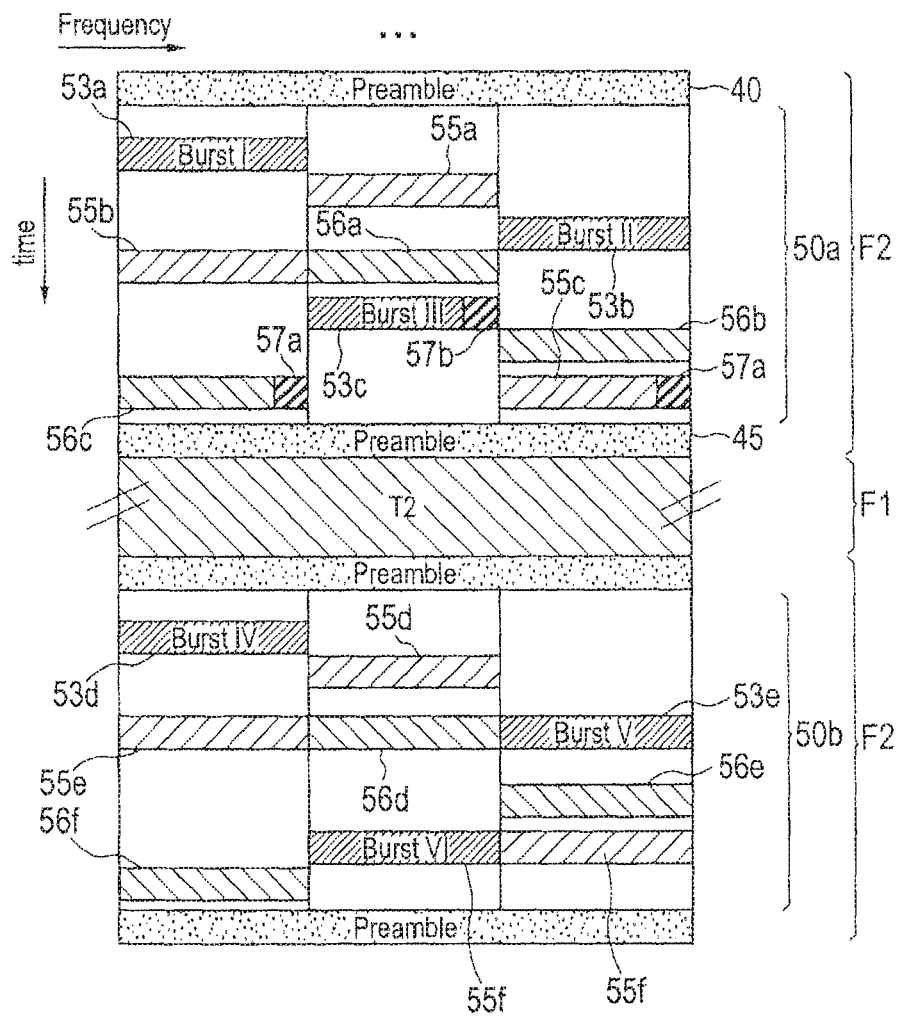
FIG. 24 shows a third embodiment for mapping signalling information into the second frames.

A further embodiment for signalling information is illustrated with reference to FIG. 24. According to this embodiment payload portion signalling blocks 53a-53c are mapped onto data symbols of the second frame 50a. Into these payload portion signalling blocks 53a-53c signalling information, in particular pointers, about the mapping of the data blocks 55d-55f, 56d-56f of the various data streams (55a-55f being data blocks of a first data stream, and 56a-56f being data blocks of another data stream) onto the data symbols of a subsequent group of second frames (or only a single second frame), here the next second frame 50b, have been included. Hence, in a group of one or more second frames (e.g. the frame 50a) all the required signalling information can be found by the receiver in one or more of the payload portion signalling blocks 53a-53c, that are required to find all data blocks 55d-55f, 56d-56f carrying payload data mapped onto the subsequent group of (one or more) second frames 50b. Instant zapping of the receiver between all data streams is thus possible within the subsequent group of (one or more) second frames 50b without any waiting time for first obtaining the required signalling information.

Additionally, some offset signalling information 57a, 57b indicating changes of the mapping of the data blocks 55a-55f, 56a-56f between said particular group of second frames 50a and said subsequent group of second frames 50b can be included into in-band signalling information or into one or more payload portion signalling blocks mapped onto data symbols of said particular second frame. Hence, at the end of a group of (one or more) second frames said offset signalling information 57a can be mapped as in-band signalling information into one or more data blocks 55c, 56c. Alternatively, said offset signalling information 57b can be mapped into one or more payload portion signalling blocks 53c. Said offset signalling information 57a, 57b indicates how the signalling information changes from this group of second frames 50a to the next group of second frames 50b (or any other subsequent frame) so that in the next (or subsequent) group(s) of second frames 50b all the signalling information must not necessarily be mapped into payload portion signalling blocks or must at least not be obtained by the receiver. In other words, mainly some offset information is mapped into the frames, particularly to save time (in the receiver).

Figure 14:
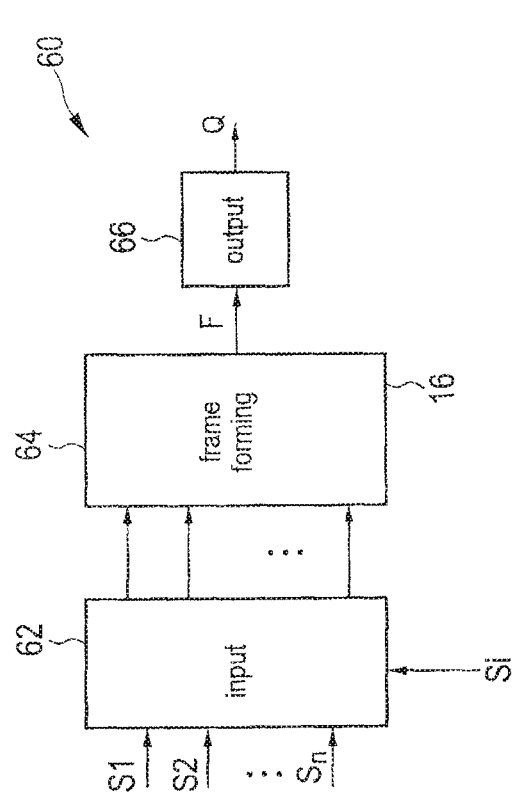
FIG. 14 shows a second embodiment of a mapping apparatus according to the present invention.
Figure 15:
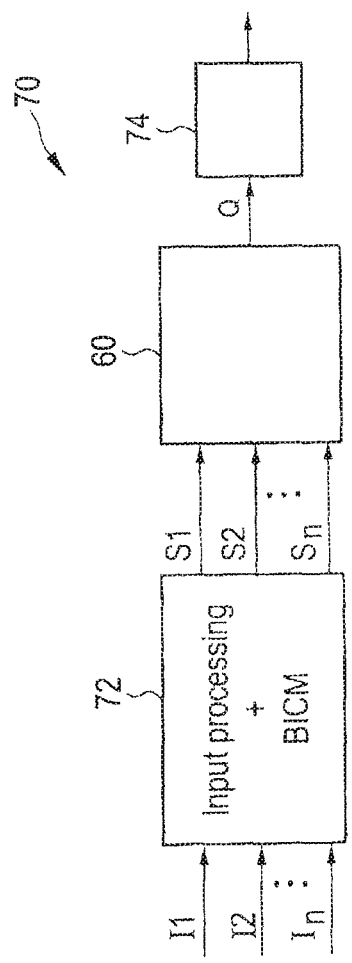
FIG. 15 shows a second embodiment of a transmitter according to the present invention.

Another embodiment of a mapping apparatus 60 according to the present invention is schematically depicted in FIG. 14. A corresponding transmission apparatus 70 comprising such a mapping apparatus 60 is depicted in FIG. 15. The main difference between the mapping apparatus 60 shown in FIG. 14 and the mapping apparatus shown in FIG. 1 is that according to the embodiment of the mapping apparatus 60 shown in FIG. 14 only a single frame forming unit 64 is provided following the data input 62 and that no stream forming unit 18 is provided. Said frame forming unit 64 basically corresponds to the second frame forming unit 16 as shown in FIG. 1, but is adapted for mapping the data blocks of the mapping input data streams S1, S2, . . . , Sn onto frames F having a frame structure as shown in FIG. 10 for the second frames F2.

In other words, the data blocks are mapped onto said frame F such that they are spread in time and frequency over various data symbols and various data segments of the frame F2 as shown in FIG. 10 or as further explained above regarding further variations of the frame structure for the frame F2. Thus, said frame structure applied by the frame forming unit 64 provides a time and frequency diversity enabling the use of a narrow-band receiver and providing the desired low power consumption of the receiver. The generated frames F are generally arranged sequentially and are then outputted by the data output 66 as mapping output data stream Q for further processing and/or transmission.

The transmitter 70 shown in FIG. 15 differs from the transmitter 30 shown in FIG. 2 in that it only comprises a single pre-processing unit 72 which basically corresponds to the pre-processing unit 34, according to which the input data streams I1, I2, . . . , In are processed as defined in the DVB-T2 or DVB-C2 standard. Of course, the pre-processing may also be employed in a different way and must not necessarily be consistent with the DVT-T2 or DVB-C2 standard (or any standard). For transmission of the mapping output data stream Q a transmitter unit 74 is provided which generally corresponds to the transmitter unit 36 shown in FIG. 2.

Figure 16:
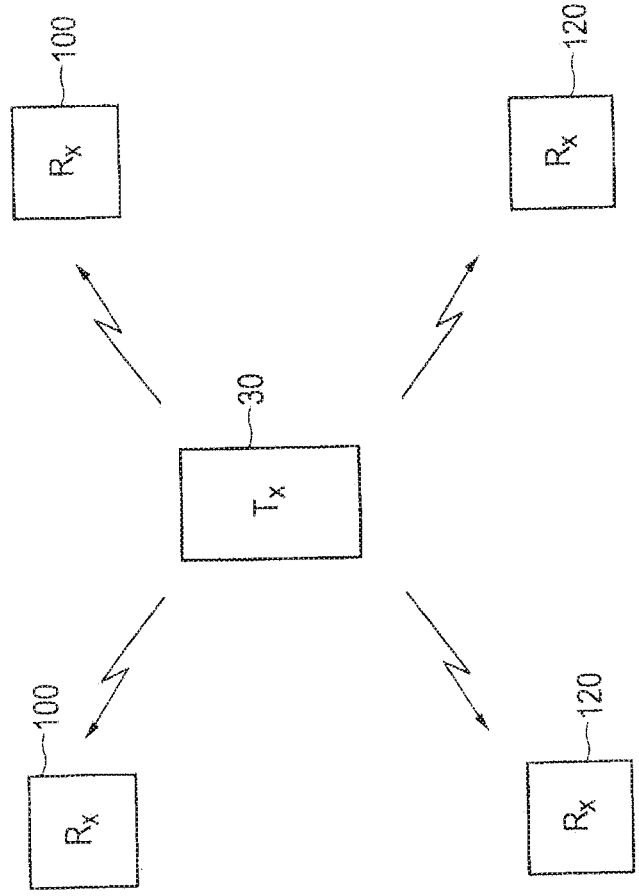
FIG. 16 shows a first embodiment of a broadcast system according to the present invention.

FIG. 16 shows a schematic block diagram of a broadcast system according to the present invention. In this embodiment, a transmitter (Tx) 30 as schematically depicted in FIG. 2 and a plurality of various receivers (Rx) 100, 120 are provided for receiving data broadcast by said transmitter 30. The receivers 100 may, for instance, be stationary receivers, e.g. in accordance with the DVB-T2 standard, and the receivers 120 may, for instance, be mobile receivers, e.g. in accordance with the upcoming DVB-NGH standard. The transmission signals of the transmitter 30 are constructed as explained above, i.e. may have a superframe structure as depicted in FIG. 9, and are not particularly adapted only for reception by a single type of receivers, but by both types of receivers 100, 120.

Figure 17:
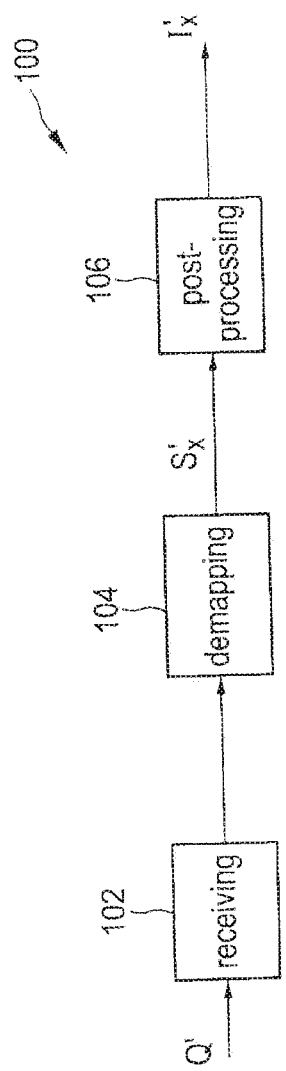
FIG. 17 shows an embodiment of a receiver of a first type used in said broadcast system shown in FIG. 16.

An embodiment of a (stationary) receiver 100 is schematically depicted in FIG. 17. It comprises a receiving unit 102 for receiving a demapping input data stream Q', which basically corresponds to the mapping output data stream Q transmitted by the transmitter 30, but possibly disturbed due to disturbances introduced by the transmission channel between the transmitter 30 and the receiver 100. The received demapping input data stream Q' is provided to a demapping apparatus 104 which then demaps the desired data stream (i.e. the desired service) Sx' therefrom. Said demapping will be explained in more detail below. There-after, the demapped data stream Sx' is further processed in a post-processing unit 106. Said post-processing may include cell/time deinterleaving, constellation demapping, bit de-interleaving, LDPC/BCH decoding, BBFRAME processing, dejittering and null packet reinserting as, for instance, commonly provided in a receiver according to the DVB-T2 standard. After said post-processing, the desired data stream Ix', which corresponds to one of the transmitter input data streams I1, I2, . . . , Im, is outputted.

Figure 18:
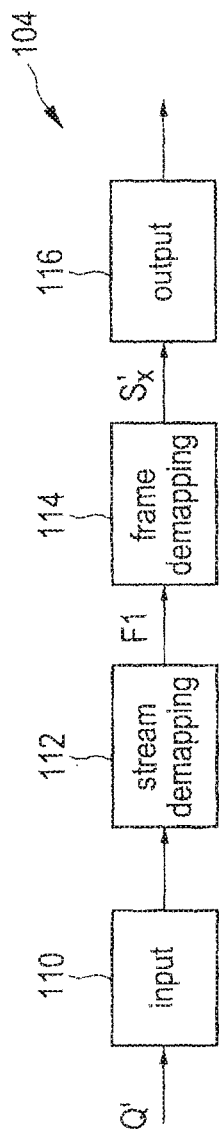
FIG. 18 shows a demapping apparatus of the receiver shown in FIG. 17.

An embodiment of the demapping apparatus 104 is schematically depicted in FIG. 18. Said demapping apparatus 104 comprises a data input 110, at which the demapping input data stream Q' is received. Said demapping input data stream Q' is constructed as explained above for the mapping output data stream Q. It comprises one or more first frames F1 and one or more second frames F2, which are alternately arranged. The frame structures of the first frames F1 and the second frames F2 are generally different, and for each frame structure various embodiments exist, as explained above in detail.

The received demapping input data stream Q' is then provided to a stream demapping unit 112, in which the first frames F1 are demapped from the demapping input data stream Q'. These first frames F1 are then provided to a frame demapping unit 114, in which they are further demapped for obtaining a desired mapping output data stream Sx', which is then outputted by the data output 116 for post-processing by the post-processing unit 106.

The stream demapping and frame demapping performed in this embodiment of the demapping apparatus 104 is commonly known and, for instance, be performed in accordance with the DVB-T2 standard, if the demapping apparatus 104 is part of a stationary receiver 100 in accordance with the DVB-T2 standard, as is the case in this embodiment. Hence, no further details need to be explained here, as all these details are generally known in the art. The F1 frames may, for instance, be the T2 frames of a superframe structure shown in FIG. 9, having a frame structure as, for instance, shown in FIGS. 3 and 4. Of course, however, other frame structures and other stream structures may be used as well, in which case the demapping apparatus 104 and its elements are adapted accordingly.

Figure 19:
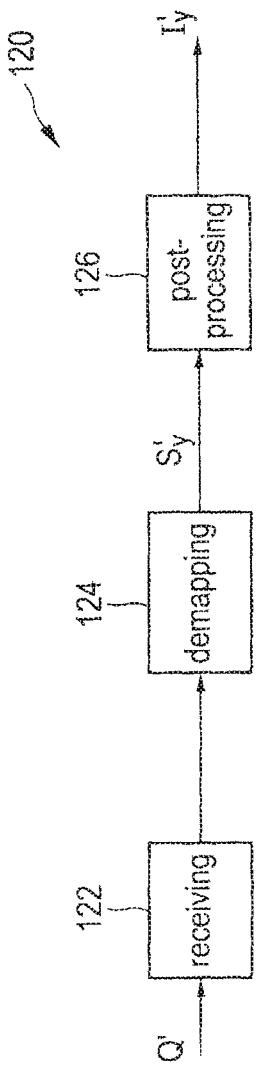
FIG. 19 shows an embodiment of a receiver of second type according to the present invention used in said broadcast system shown in FIG. 16.

An embodiment of a receiver 120 in accordance with the present invention is schematically depicted in FIG. 19. The general layout of the receiver 120 is similar (or even the same) as the layout of the receiver 100 as depicted in FIG. 17. However, the layout and function of the separate units of the receivers 100, 120 are different.

A receiving unit 122 is provided for receiving the receiver input data stream Q', which is provided to a demapping apparatus 124. Therein, the desired data stream Sy' is demapped, which is subjected to post-processing in the post-processing unit 126, to obtain the desired receiver output data stream Iy'. The post-processing in the post-processing 126 may generally be similar or identical to the post-processing performed in the post-processing unit 106 of the receiver 100, however is adapted such that it interrelates with the pre-processing performed in the pre-processing unit 34 of the transmitter 30. Hence, if the pre-processing in the pre-processing unit 34 of the transmitter 30 is, for instance, performed in accordance with the DVB-T2 or DVB-C2 standard, the post-processing in the post-processing unit 126 is adapted accordingly in accordance with the respective standard.

Figure 20:
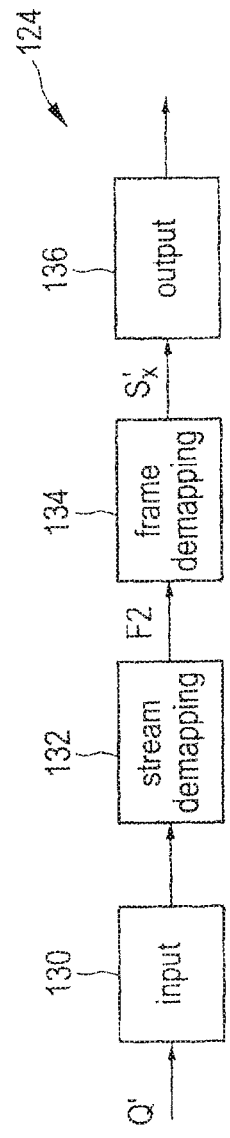
FIG. 20 shows a demapping apparatus of the receiver shown in FIG. 19.

An embodiment of the demapping apparatus 124 is schematically depicted in FIG. 20. Again, the demapping apparatus 124 generally comprises the same layout as the demapping apparatus 104 of the receiver 100. However, the layout and functions of the separate units of the demapping apparatus 124 are different.

At the data input 130 the demapping input data stream Q' is received, which is provided for stream demapping in a stream demapping unit 132. Here, the frames F2 are demapped from the demapping input data stream Q'. These frames F2 may, for instance, be incorporated into the superframe structure as provided according to the DVB-T2 standard as FEF frames as shown in FIG. 9. These frames F2 are then provided to a frame demapping unit 134, which demaps a demapping output data stream Sy' from said second frames. Said second frames F2 generally have a frame structure, which is different from the frame structure of the first frames F1, which second frame structure has been explained above with various modifications in FIGS. 7, 8, 10 to 12.

In particular, said frame demapping unit 134 is adapted for demapping said second frames F2 comprising a preamble portion 40 and a payload portion 50 into said demapping output data stream Sy'. Said frame demapping unit 134 is particularly adapted for demapping the signalling data S1 from the preamble portion 40 and for demapping the data blocks of the demapping, output data stream Sy' from the payload portion 50 by use of said signalling information S1. The derived demapping output data stream Sy' is then provided to a data output 136 for output to the post-processing unit 126.

Since the frame structure of the second frames F2 uses, as explained above, a segmented concept, according to which the payload portion is segmented into data segments, a narrow-band receiver 120 can be used, which, in some embodiments, must not be able to be tuned to and receive the complete channel bandwidth of the complete frame F2, but must only be able to be tuned to and receive a bandwidth portion of said total channel bandwidth. This is possible, despite the frame structures of both the first and second frames F1, F2 use the total channel bandwidth, which, however, can slightly vary for the two types of frames (e.g. 7.61 MHz for a first type, and 7.62 MHz for the second type of frames), i.e. the channel bandwidth of both types is in the same order.

The size of the bandwidth portion of the receiver 120 depends on the bandwidth portion covered by data blocks of the desired demapping output data stream Sy'. If, for instance, all the data blocks of the desired demapping output data stream Sy' are stored in a single data segment only, it is sufficient if the receiver can be tuned to and receive the bandwidth covered by said data segment. If, as provided in another embodiment, the data blocks of the desired demapping output data stream Sy' (in frequency direction) cover two or more (neighbouring or not neighbouring) data segments at a particular moment in time, the receiver must be able to be tuned to and receive a larger bandwidth portion.

The information about the bandwidth portion, in particular its size and its frequencies, are generally signalled from the transmitter to the receiver within the signalling information. This signalling information also contains information about the locations of the data blocks of the various data streams, to enable the receiver to change its tuning accordingly. As explained above, particularly with reference to FIGS. 11 to 13, for signalling of the required information, various embodiments exist. Hence, the frame demapping unit 134 is adapted accordingly to find, collect, deinterleave, decode and make use of said signalling information for demap-ping the desired data blocks from the frames F2.

Figure 21:
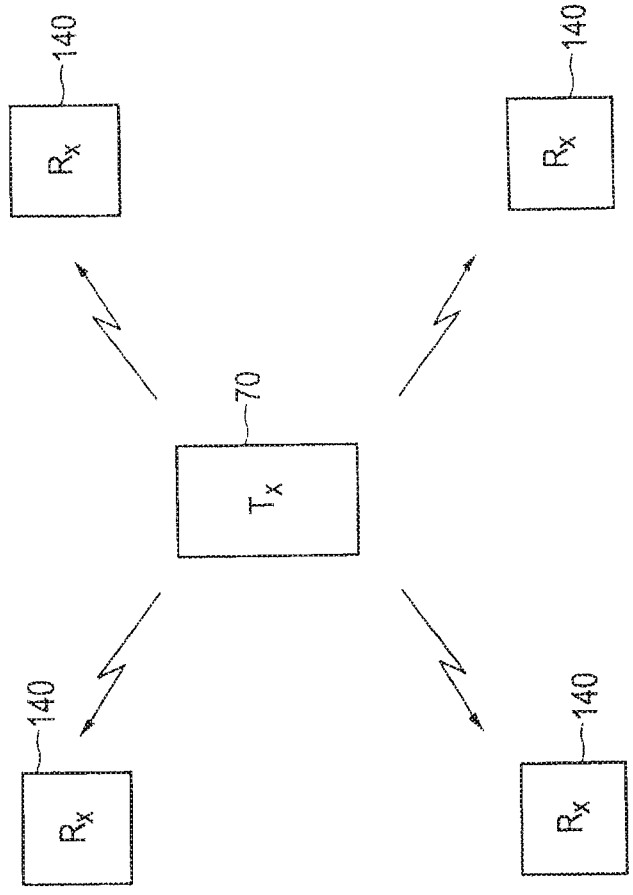
FIG. 21 shows a second embodiment of a broadcast system according to the present invention.

FIG. 21 shows another embodiment of a broadcast system in accordance with the present invention. In this embodiment, the transmitter 70 is used as depicted in FIG. 15. According to said embodiment, only a single type of frames F is used (i.e. no superframe structure of superframes 13 containing first and second frames F1, F2 is used, but another superframe structure containing only frames F), onto which the data blocks of the various data streams are mapped. The mapping is provided such that the data blocks are spread in time and frequency over various data symbols and various data segments of the frames F, such as, for instance, depicted in FIG. 10. Accordingly, only a single type of receivers 140 (preferably a mobile receiver) is provided in the broadcast system, which is designed to enable reception and decoding of data streams transmitted by said type of transmitter 70.

Figure 22:
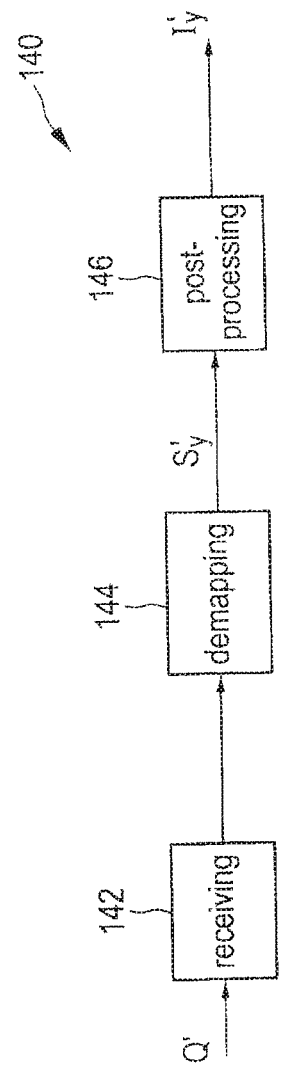
FIG. 22 shows another embodiment of a receiver according to the present invention used in said broadcast system shown in FIG. 21.
Figure 23:
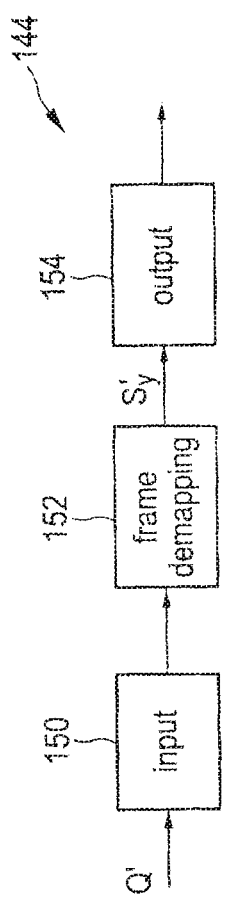
FIG. 23 shows a demapping apparatus of the receiver shown in FIG. 22.

The layout of such a receiver 140 is schematically shown in FIG. 22, which corresponds to the layout of the receivers 100, 120. The receiver 140 also comprises a receiving unit 142, a demapping apparatus 144 and a post-processing unit 146. However, particularly the demapping apparatus 144 is different as shown in FIG. 23. In particular, said demapping apparatus 144 does not comprise any stream demapping unit as provided in the demapping apparatus 104, 124 of the receivers 100, 120, since no superframe structure is used, but the demapping input data stream Q' only comprises a single type of frames. From the data input 150, said demapping input data stream Q' is provided to the frame demapping unit 152, by which the de-mapping output data stream Sy' is demapped, which is then outputted via the data output 154 for post-processing. The frame demapping unit 152 generally has the same layout and function as the frame demapping unit 134 of the demapping apparatus 124 of the second type (mobile) receiver 120, since the frame structure of the frames F used by the transmitter 70 is generally the same as the frame structure of the second frames F2 used by the transmitter 30. Of course, the same various embodiments exist also for the frame mapping unit 152 that have been explained above for the frame demapping unit 134.

For reception of the receiver input data stream Q', a single antenna and a single tuner is generally sufficient in the receiver. Receivers (e.g. mobile receivers) may, however, also be provided with two or more antennas and/or two or more tuner, which can particularly be used to advantage if the data blocks of the data stream that shall be received are spread (in time and/or frequency) over more than one data segment and/or data symbol. For instance, in case of spreading in time, a first antenna (and/or tuner) can be controlled to receive a first data block mapped onto a first data segment and the second antenna (and/or tuner) can be controlled to "look ahead" in time (e.g. be tuned to another frequency) for reception of the next data block mapped onto another data segment at the appropriate time. In another embodiment, in particular in case of spreading in frequency, both antennas (and/or tuners) can be controlled to receive the data blocks mapped onto the two data segments at the same time. In this way, tuning time in the receiver can be saved and more sleeping times for the receivers can possibly be provided.

In the following another embodiment of the mapping apparatus and the demapping apparatus shall be explained. Goal of the framing with bandwidth segmentation as explained above using a frame structure as shown in FIGS. 7 to 12 is to allow for a reduced receiver complexity with a special emphasis on lower power consumption. Derived from the existing ISDB-T1 segment example it is expected that a reduced reception bandwidth has several significant advantages in power consumption (lower tuning bandwidth, lower A/D sampling rate and lower baseband decoding effort).

A single data segment (or data slice) of a second frame F2 of e.g. 1.7 MHz is capable to include most typical DVB-NGH bitrates (e.g. below 1 MBit/s). However, there may be a need to cover services with higher bitrates up to 4 MBit/s, which cannot be accommodated in all so-called ModCod combinations (defining the modulation scheme and coding rate) in a single data slice (i.e. data segment). As mentioned this bottleneck appears already for some very robust ModCod combinations in standalone DVB-NGH operation mode, i.e. DVB-NGH can use all resources in a dedicated RF channel (no T2 frames in FIG. 9). The bottleneck is, however, more significant in case of mixed NGH/T2 operation, which means that NGH frames (second frames F2) are embedded into so-called T2 FEFs (Future Extension Frames). In that case the overall channel resources are linearly divided between T2 and NGH services. Such a superframe structure is depicted in FIG. 9.

As a solution for this obvious data rate bottleneck it is possible to spread data of a single service (i.e. PLP or physical layer pipe), across several data slices in parallel. For instance, in the embodiment shown in FIG. 8 data blocks of a single PLP are located within one single data slice per time instance (e.g. of data slice 0). As shown in FIG. 10 the chosen data slice can change even within a second frame F2 (hopping), i.e. the tuner in the receiver may require to change frequently its tuning position.

In this operation mode, the data slice bandwidth is chosen according to the lowest NGH requirement, i.e. 1.7 MHz. It requires only single data slice decoding and allows best possible power savings (only about 25% of the power is needed compared to a regular 8 MHz tuner that is tuned to the complete bandwidth of the frame of 8 MHz). As mentioned, there is a bottleneck for maximum throughput rate per PLP (input data stream).

To accommodate higher bitrates a resource block approach is proposed in an embodiment according to which two or more (preferably neighbouring) data slices are bundled. Thus, the data blocks of a PLP are distributed not only on the data symbols of a single data slice but of said bundled data slices. The overall frame structure is still the same as for the 1.7 MHz tuner scenario, but in general an 8 MHz tuner is required to decode data blocks of all relevant data slices. The resource block approach is still applicable and efficient, typically only a few data blocks contain data of the target PLP. The maximum throughput rate per PLP can increase up to the whole NGH bandwidth due to the proposed data slice bundling.

Figure 25:
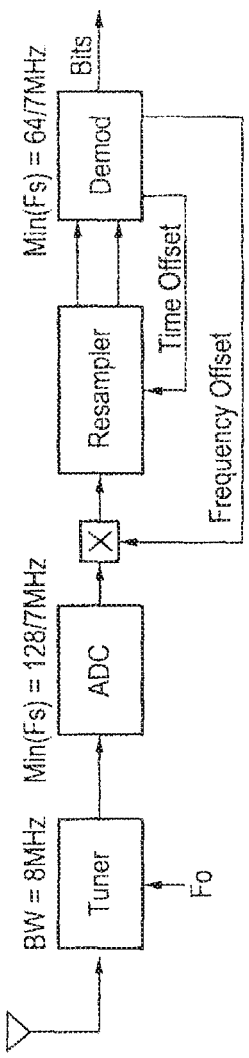
FIG. 25 shows a first embodiment of a known tuner architecture.
Figure 26:
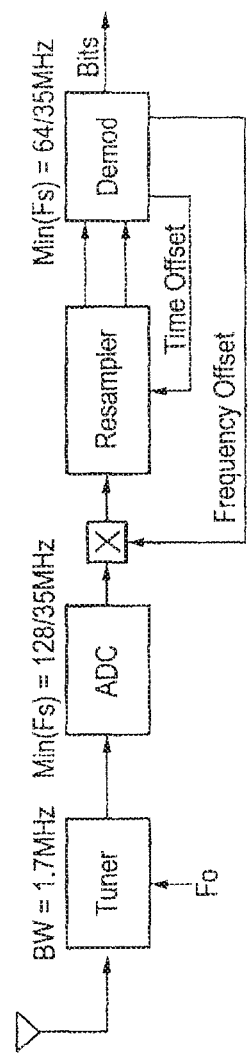
FIG. 26 shows a second embodiment of a known tuner architecture.

For better understanding the two basic tuner architectures with 8 MHz and 1.7 MHz are depicted in FIGS. 25 and 26. FIG. 25 shows a standard 8 MHz tuner architecture for tuning on the complete bandwidth of a F2 frame, and FIG. 26 shows a standard 1.7 MHz tuner architecture for tuning on the bandwidth of a single data slice of a F2 frame. It should be noted that the analog filtering in the tuner before AD conversion is seen as one major complex and static block.

As soon as data slices are bundled, a tuner having a higher bandwidth is required. So far tuning bandwidths have been a fixed parameter, i.e. standard tuning bandwidths such as 1.7 MHz or 8 MHz have been used. Thus, as soon as a service exceeds a single data slice the receiver has to mandatorily support an 8 MHz tuner so that the desired power savings in the receiver are not achieved.

Hence, it is proposed to adapt the tuning bandwidth to the bandwidth requirement of either the highest bitrate PLP or even the current decoded PLP itself. In this case the power consumption of the decoder could be optimized according to the desired bandwidth. The proposed tuner architecture thus covers exactly that number of data slices that are required at minimum.

Figure 27:
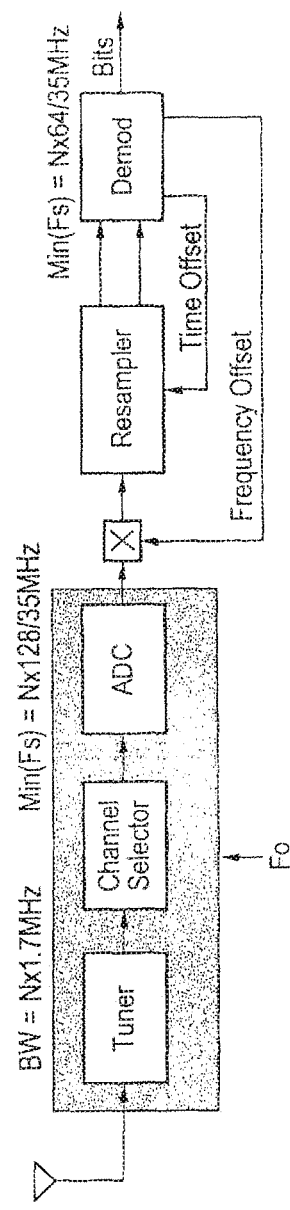
FIG. 27 shows a first embodiment of a proposed tuner architecture.
Figure 28:
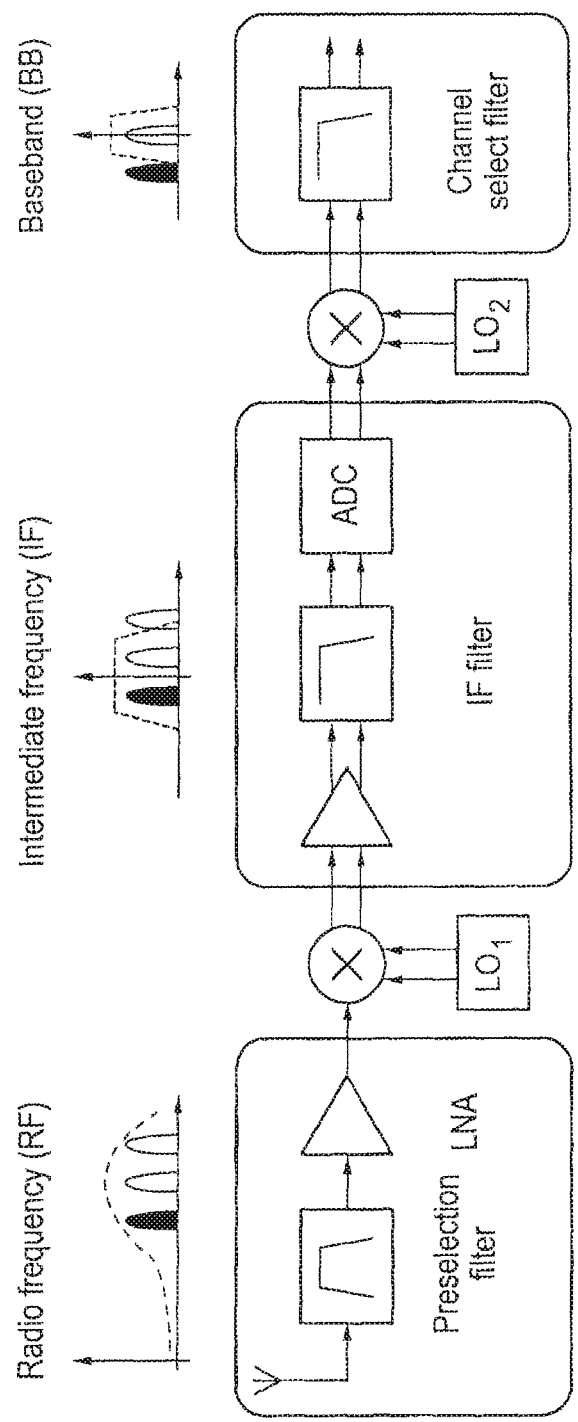
FIG. 28 shows a second embodiment of a proposed tuner architecture.

FIG. 27 shows an embodiment of such a tuner (N being the number of bundled data slices). The demodulator sees for each OFDM symbol only data slices carrying data blocks belonging to the specific PLP. This however requires tuning architectures that are scalable in their bandwidth with a low level of complexity. A more detailed exemplary embodiment of such a tuner is shown in FIG. 28.

The preselection filter as well as the following amplifier have a rather large bandwidth and are uncritical for all possible number of data slices. After the LO1 down-conversion and the (low complexity but bandwidth specific) IF filter the AD conversion takes place. The clock rate of this AD conversion is linearly scaled according to the number of data slices (or data symbols) to be covered at a particular moment in time, and all following filtering processes are done in the digital domain and can be scaled with the bandwidth, too.

Generally, these tuning architectures allow such a data slice specific, low complexity scalability that is required to achieve the best possible power consumption efficiency for different bandwidths. Therefore, it is proposed for best power efficiency to adjust of the tuning bandwidth, preferably according to the PLP requirements (i.e. 1 . . . N data slices). An embodiment of a frame structure showing that the number of (neighbouring) data symbols bundled for storing a corresponding number of data blocks of a mapping input data stream is shown in FIG. 29.

Figure 29:
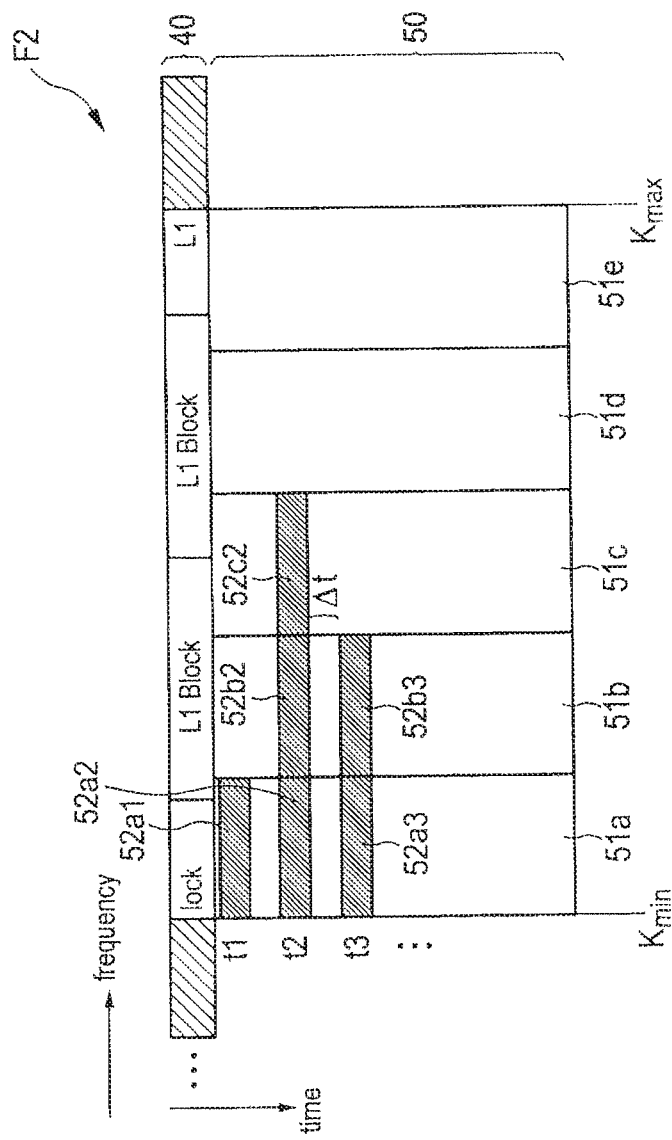
FIG. 29 shows a third embodiment of a frame structure of the second frame.

As can be seen from FIG. 29, the number of bundled data symbols can be changed from time to time also within a single F2 frame. For instance, at time t1 only a single data symbol 52a of the first data segment 51a is used for transmitting a single data block of a particular mapping input data stream (i.e. a single PLP or a single service). At time t2 three data symbol 52a2, 52b2, 52c2 of the data segments 51a, 51b, 51c are used for transmitting three data blocks of a particular mapping input data stream. At time t3 two data symbol 52a3, 52b3 of the data segments 51a, 51b are used for transmitting two data blocks of a particular mapping input data stream. Accordingly the tuning bandwidth is varied (on the fly) in the receiver leading to respective power savings if the tuner is tuned to a smaller bandwidth.

As shown in FIG. 29 there is a time gap At between the subsequent data symbols, during which a receiver might either fall into sleep mode to save power (if the time gap At is long enough), or during which the tuner of the receiver has at least sufficient time to tune to the correct bandwidth, to synchronize and to estimate the channel, if said bandwidth is changed as shown in FIG. 29.

With a suitable tuner architecture, however, the time gap At (of the embodiment of the frame structure shown in either FIG. 10 or FIG. 29) can be minimized or even completely omitted. The embodiment of the tuner shown in FIG. 28 can be used as such a suitable tuner architecture, in particular due to the fact that after the AD conversion the components, in particular the mixer and the oscillator L02, are working in the digital domain, which provides a much higher accuracy of the tuning to the correct frequencies than analog components. I.e. there is a much lower risk of incorrect tuning or loss of tracking. Moreover, the retuning in the digital domain is much faster.

If the tuner knows (e.g. from a scheduler or through some other information) or can predict that the tuner has to tune to a different bandwidth portion at a particular switching moment, it can shortly before said switching moment increase its bandwidth to cover both the actual bandwidth portion and the future bandwidth portion, and after the switching moment decrease its bandwidth to only cover the new bandwidth portion. This also provides the advantage that the tuner can perform necessary actions like synchronisation and/or channel estimation already before it actually tunes to the new bandwidth portion.

In alternative embodiments, the bundling of data symbols (or data segments) not changed within a frame, but only from frame to frame. Further, in an embodiment the number of bundled data symbols or data slices is not determined on the fly depending on the actual needs of the service whose data blocks are to be mapped onto the frames, but is determined in advance.

Hence, according to this proposal the best power efficient combined T2/NGH receiver can be realized: In T2 frames the tuner switches to 8 MHz tuner while an appropriate downscaling is applied during NGH frames and their services, i.e. the tuner is switched to a lower bandwidth (and/or a lower data rate) when receiving the NGH frames according to the bandwidth actually used for the service to be actually received. Further, even the signalling PLP can occupy several data slices in parallel to carry more L1 signalling information.

In still a further embodiment the proposed scalable tuner can be used for tuning to a bandwidth covering both the data symbols (or data segments) of the currently received service and payload portion signalling blocks (e.g. 53a-53c, see FIG. 24) of the same and/or other services, in particular if data symbols of the currently received service and payload portion signalling blocks of the same and/or other services are mapped into the frame at same time moments but into different data segments. Preferably, in this way the payload portion signalling blocks of all service can always be acquired in advance, even if it is not (yet) known to the tuner (and/or receiver) if they will actually all be needed. This contributes to savings in time for tuning to and acquiring payload portion signalling blocks of a new service, which would otherwise be required if a switch to a new service is made.

In another alternative embodiment, rather than using a tuner that is scalable in bandwidth two or more tuners can be used that are (fixedly) tuned to different bandwidths and that can be alternately used as needed and as appropriate according to the actual bandwidth of the service to be actually received.

In summary, the present invention enables the use of narrow-band receivers having a low power consumption even if the frame structure used by the transmitter of the multi-carrier broadcast system has a much broader channel bandwidth. Further, various embodiments are provided, which enable further savings in power consumption of receivers, which is particularly important for mobile receivers. Still further, an increased or at least selectable robustness for selected services due to the use of time and/or frequency diversity in the mapping of data blocks of the services onto frames having a segmented frame structure can be achieved.

A data segment of the payload portion can be used only for a single data stream or can be split up in time and/or frequency direction for use by data blocks of two or more data streams. The respective use of the data segment, i.e. the mapping of the data blocks of the various data streams on the data segments of the frames, can be static (i.e. continuously fixed) for the whole transmission of a data stream, can be quasi-static (i.e. fixed for a group of frames or only a single frame, i.e. can be changed from frame to frame) or can be continuously changed (i.e. also with frames). In the latter embodiments more signalling is required compared to the first (static) embodiment.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A receiver apparatus comprising:
   circuitry configured to:
   receive an input data stream mapped onto a plurality of data symbols in at least one data frame having (i) a channel bandwidth comprising subcarriers in a frequency direction and (ii) data symbols in a time direction, the at least one data frame including a preamble portion and a payload portion,
   demap from the preamble portion at least one preamble signaling block that includes signaling information,
   demap from the payload portion a first physical layer pipe (PLP) and a second PLP in accordance with the signaling information, wherein the payload portion is segmented into data segments each covering a different bandwidth portion of the channel bandwidth, the PLPs being spread over various data symbols and various data segments in time and frequency,
   demap data from other data symbols which are arranged differently to said payload portion, the other data symbols covering the whole channel bandwidth and carrying one PLP, and
   output a data stream comprising data demapped from the preamble portion, the payload portion, and the other data symbols.

2. The receiver apparatus according to claim 1, wherein the other data symbols carry further payload data.

3. The receiver apparatus according to claim 1, wherein the other data symbols are not segmented into data segments, with each of the other data symbols covering a different bandwidth portion of the channel bandwidth.

4. The receiver apparatus according to claim 1, wherein the circuitry is further configured to
   identify and decode the signaling information, and
   demap data from at least one of the payload portion or the other data symbols using the decoded signaling information.

5. The receiver apparatus according to claim 1, wherein:
   at least one data symbol of the first PLP and at least one data symbol of the second PLP are separated in the time direction, and
   the first and second PLPs use a same bandwidth portion in the frequency direction.

6. The receiver apparatus according to claim 1, wherein the circuitry is further configured to demap the other data symbols using further signaling information.

7. The receiver apparatus according to claim 6, wherein the further signaling information is included in the preamble portion.

8. A receiving method comprising:
   receiving an input data stream mapped onto a plurality of data symbols in at least one data frame having (i) a channel bandwidth comprising subcarriers in a frequency direction and (ii) data symbols in a time direction, the at least one data frame including a preamble portion and a payload portion;
   demapping from the preamble portion at least one preamble signaling block that includes signaling information;
   demapping from the payload portion a first physical layer pipe (PLP) and a second PLP in accordance with the signaling information, wherein the payload portion is segmented into data segments each covering a different bandwidth portion of the channel bandwidth, the PLPs being spread over various data symbols and various data segments in time and frequency;
   demapping data from other data symbols which are arranged differently to said payload portion, the other data symbols covering the whole channel bandwidth and carrying one PLP; and
   outputting a data stream comprising data demapped from the preamble portion, the payload portion, and the other data symbols.

9. The receiving method according to claim 8, wherein the other data symbols carry further payload data.

10. The receiving method according to claim 8, wherein the other data symbols are not segmented into data segments, with each of the other data symbols covering a different bandwidth portion of the channel bandwidth.

11. The receiving method according to claim 8, further comprising:
    identifying and decoding the signaling information; and
    demapping data from at least one of the payload portion or the other data symbols using the decoded signaling information.

12. The receiving method according to claim 8, wherein:
    at least one data symbol of the first PLP and at least one data symbol of the second PLP are separated in the time direction, and
    the first and second PLPs use a same bandwidth portion in the frequency direction.

13. The receiving method according to claim 8, further comprising:
    demapping the other data symbols using further signaling information.

14. The receiving method according to claim 13, wherein the further signaling information is included in the preamble portion.

15. A non-transitory computer readable medium including computer executable instructions stored thereon which, when carried out on a computer, cause the computer to perform a method comprising:
- receiving an input data stream mapped onto a plurality of data symbols in at least one data frame having (i) a channel bandwidth comprising subcarriers in a frequency direction and (ii) data symbols in a time direction, the at least one data frame including a preamble portion and a payload portion;
- demapping from the preamble portion at least one preamble signaling block that includes signaling information;
- demapping from the payload portion a first physical layer pipe (PLP) and a second PLP in accordance with the signaling information, wherein the payload portion is segmented into data segments each covering a different bandwidth portion of the channel bandwidth, the PLPs being spread over various data symbols and various data segments in time and frequency;
- demapping data from other data symbols which are arranged differently to said payload portion, the other data symbols covering the whole channel bandwidth and carrying one PLP; and
- outputting a data stream comprising data demapped from the preamble portion, the payload portion, and the other data symbols.

16. The non-transitory computer readable medium according to claim 15, wherein the other data symbols are not segmented into data segments, with each of the other data symbols covering a different bandwidth portion of the channel bandwidth.

17. The non-transitory computer readable medium according to claim 15, wherein the method further comprises:
- identifying and decoding the signaling information; and
- demapping data from at least one of the payload portion or the other data symbols using the decoded signaling information.

18. The non-transitory computer readable medium according to claim 15, wherein:
- at least one data symbol of the first PLP and at least one data symbol of the second PLP are separated in the time direction, and
- the first and second PLPs use a same bandwidth portion in the frequency direction.

19. The non-transitory computer readable medium according to claim 15, wherein the method further comprises:
- demapping the other data symbols using further signaling information.

20. The non-transitory computer readable medium according to claim 19, wherein the further signaling information is included in the preamble portion.

* * * * *